(12) United States Patent
Ota et al.

(10) Patent No.: US 8,208,220 B1
(45) Date of Patent: Jun. 26, 2012

(54) MAGNETIC HEAD, HEAD ASSEMBLY, AND MAGNETIC RECORDING/REPRODUCING APPARATUS TO REDUCE RISK OF WIDE AREA TRACK ERASE

(75) Inventors: Minoru Ota, Tokyo (JP); Kei Hirata, Tokyo (JP); Kenkichi Anagawa, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 12/961,939

(22) Filed: Dec. 7, 2010

(51) Int. Cl.
*G11B 5/127* (2006.01)

(52) U.S. Cl. .................................. 360/125.07
(58) Field of Classification Search ............... 360/125.07
See application file for complete search history.

(56) References Cited

U.S. PATENT DOCUMENTS

| | | | |
|---|---|---|---|
| 6,958,886 B2 * | 10/2005 | Takahashi et al. ....... | 360/125.13 |
| 2004/0021985 A1 | 2/2004 | Pokhil et al. | |
| 2006/0126223 A1 | 6/2006 | Kameda | |
| 2007/0188921 A1 | 8/2007 | Mochizuki et al. | |
| 2007/0209193 A1 | 9/2007 | Kobayashi | |
| 2008/0239569 A1 | 10/2008 | Yazawa et al. | |
| 2008/0266721 A1 | 10/2008 | Kameda | |
| 2010/0149697 A1 | 6/2010 | Nunokawa et al. | |

FOREIGN PATENT DOCUMENTS

| | | |
|---|---|---|
| JP | 2004-71139 | 3/2004 |
| JP | 2006-164463 | 6/2006 |
| JP | 2007-220208 | 8/2007 |
| JP | 2007-250018 | 9/2007 |
| JP | 2008-276819 | 11/2008 |
| JP | 2008-276902 | 11/2008 |
| JP | 2010-146600 | 7/2010 |

* cited by examiner

*Primary Examiner* — David D Davis
(74) *Attorney, Agent, or Firm* — Oblon, Spivak, McClelland, Maier & Neustadt, L.L.P.

(57) ABSTRACT

A magnetic head includes a main magnetic pole layer and a yoke layer. The main magnetic pole layer generates a magnetic flux of a recording magnetic field and includes a magnetic pole front part and a magnetic pole rear part. The yoke layer is disposed at the magnetic pole rear part and includes a yoke front part and a yoke rear part. The magnetic pole front part extends on a magnetic medium-facing surface side of the magnetic pole rear part with a width in a track width direction being smaller than that of the magnetic pole rear part. The yoke front part extends on the magnetic medium-facing surface side of the yoke rear part with a width in the track width direction being larger than that of the magnetic pole rear part and that of the yoke rear part.

11 Claims, 33 Drawing Sheets

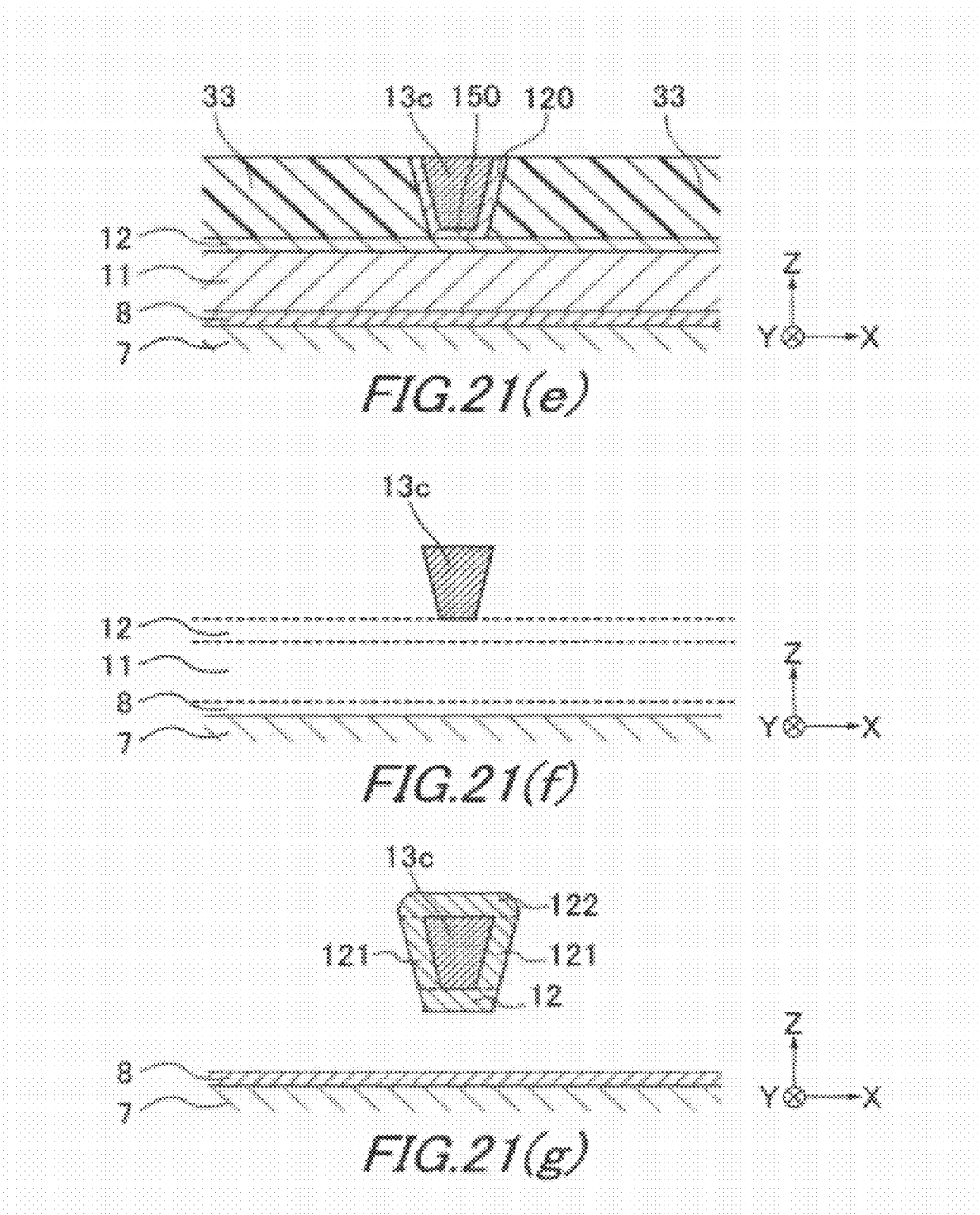

MAGNETIC HEAD, HEAD ASSEMBLY, AND MAGNETIC RECORDING/REPRODUCING APPARATUS TO REDUCE RISK OF WIDE AREA TRACK ERASE

BACKGROUND OF THE INVENTION

1. Field of the Invention

The present invention relates to a magnetic head, a head assembly, and a magnetic recording/reproducing apparatus.

2. Description of the Related Art

In order to improve writing performance of information, various improvements have been made in a perpendicular recording magnetic head to be used for a magnetic recording/reproducing apparatus such as a hard disk drive (HDD). In particular, research and development have been vigorously conducted regarding the problem of accidentally erasing information recorded on a magnetic disk being a recording medium.

For example, Japanese Unexamined Patent Application Publication No. 2006-164463 discloses a technology in which a return path layer for absorbing a return magnetic flux from a magnetic disk is shaped to have a width increasing toward a floating surface, thereby reducing the magnetic field strength at its ends in a track width direction.

Moreover, Japanese Unexamined Patent Application Publication No. 2008-276902 discloses a technology in which an auxiliary yoke layer laid on a main magnetic pole layer is provided with a distinctive flared part, thereby preventing the occurrence of pole lock-up.

Furthermore, Japanese Unexamined Patent Application Publication No. 2008-276819 discloses a technology in which an auxiliary yoke layer for circulating a magnetic flux from a return path layer to a main magnetic pole layer is formed across a plurality of layers in the manner of multi-stage connection, thereby stabilizing magnetization components of individual layers in a track width direction based on shape anisotropy.

Meanwhile, the present inventors tried to improve writing performance, based on their unique viewpoint, by uniformly narrowing the track-wise widths of a main magnetic pole layer and an auxiliary yoke layer laid thereon. As a result, it has been found that characteristics such as recording magnetic field strength, bit error rate (BER), and S/N can be improved, particularly, in a low-amperage range and a high-frequency range of a write current to be supplied to a coil. That is, the above improvement results in improving magnetic saturation characteristics of a magnetic head with respect to the write current.

However, on the other hand, it has also been found that the strength of a recording magnetic field to be applied to tracks adjacent to a target track for writing can be increased as compared with the one having a conventional width, increasing the risk of wide area track erase (WATE).

SUMMARY OF THE INVENTION

It is an object of the present invention to provide a magnetic head, a head assembly, and a magnetic recording/reproducing apparatus capable of reducing the risk of wide area track erase while improving magnetic saturation characteristics.

1. Magnetic Head

In order to achieve the above object, a magnetic head according to the present invention comprises a main magnetic pole layer, a yoke layer, and a return path magnetic pole layer.

The main magnetic pole layer is capable of generating a magnetic flux of a recording magnetic field and includes a magnetic pole front part and a magnetic pole rear part. The yoke layer is disposed at the magnetic pole rear part and includes a yoke front part and a yoke rear part. The return path magnetic pole layer is connected to the yoke rear part in such a manner as to return the magnetic flux of the recording magnetic field to the main magnetic pole layer.

In the above, the magnetic pole front part extends on a magnetic medium-facing surface side of the magnetic pole rear part with a width in a track width direction being smaller than that of the magnetic pole rear part and decreasing toward the magnetic medium-facing surface.

On the other hand, the yoke front part extends on the magnetic medium-facing surface side of the yoke rear part with a width in the track width direction being larger than that of the magnetic pole rear part and that of the yoke rear part.

The magnetic head according to the present invention comprises the main magnetic pole layer capable of generating a magnetic flux of a recording magnetic field, the yoke layer disposed at the main magnetic pole layer, and the return path magnetic pole layer connected to a yoke rear part in such a manner as to return the magnetic flux of the recording magnetic field to the main magnetic pole layer. Thus, they constitute a magnetic circuit having a path through which the magnetic flux of the recording magnetic field goes back to the return path magnetic pole layer, from the main magnetic pole layer, through an external magnetic recording medium and then goes back to the main magnetic pole layer through the yoke layer.

Since the width of the magnetic pole front part in the track width direction is smaller than that of the magnetic pole rear part and decreases toward the magnetic medium-facing surface, the magnetic flux from the magnetic pole rear part can be concentrated toward the end face on the magnetic medium-facing surface side. This increases the strength of a recording magnetic field flowing from the magnetic medium-facing surface to the magnetic recording medium, thereby improving magnetic saturation characteristics.

The most distinctive feature of the magnetic head according to the present invention resides in the shape of the yoke layer.

Since the width of the yoke front part in the track width direction is larger than that of the magnetic pole rear part and that of the yoke rear part, a part of a magnetic flux flowing from the magnetic pole rear part to the magnetic pole front part can be dispersed toward both ends in the track width direction or the vicinity thereof. Thus, at the magnetic pole front part, the magnetic flux can be prevented from excessively concentrating on the end face on the magnetic medium-facing surface side.

Therefore, the magnetic head according to the present invention can reduce the strength of a recording magnetic field to be applied to tracks adjacent to a target track for writing.

2. Head Assembly

In order to achieve the above object, a head assembly according to the present invention comprises the above magnetic head and a head support device.

The head support device supports the magnetic head in such a manner as to permit rolling and pitching of the magnetic head.

In the present invention, examples of the head assembly include an HGA (head gimbal assembly) in which the magnetic head is mounted on a head support device (gimbal) and an HAA (head arm assembly) in which the HGA is mounted on an arm.

Since the head assembly according to the present invention includes the above magnetic head, it also exhibits the effects thus far described.

3. Magnetic Recording/Reproducing Apparatus

A magnetic recording/reproducing apparatus according to the present invention comprises the above head assembly and a magnetic recording medium. The head assembly is capable of recording information on the magnetic recording medium by applying the recording magnetic field and reproducing information from the magnetic recording medium. A typical example of the magnetic recording/reproducing apparatus is a hard disk drive (HDD) using a magnetic recording medium called "hard disk".

Since the head assembly according to the present invention includes the above magnetic head, it also exhibits the effects thus far described.

The other objects, constructions and advantages of the present invention will be further detailed below with reference to the attached drawings. However, the attached drawings show only illustrative examples.

BRIEF DESCRIPTION OF THE DRAWINGS

FIGS. 21(a) to 21(m) are sectional views showing a production process of a magnetic head as seen from a magnetic medium-facing surface;

DESCRIPTION OF THE PREFERRED EMBODIMENTS

1. Magnetic Head

Figure 1:
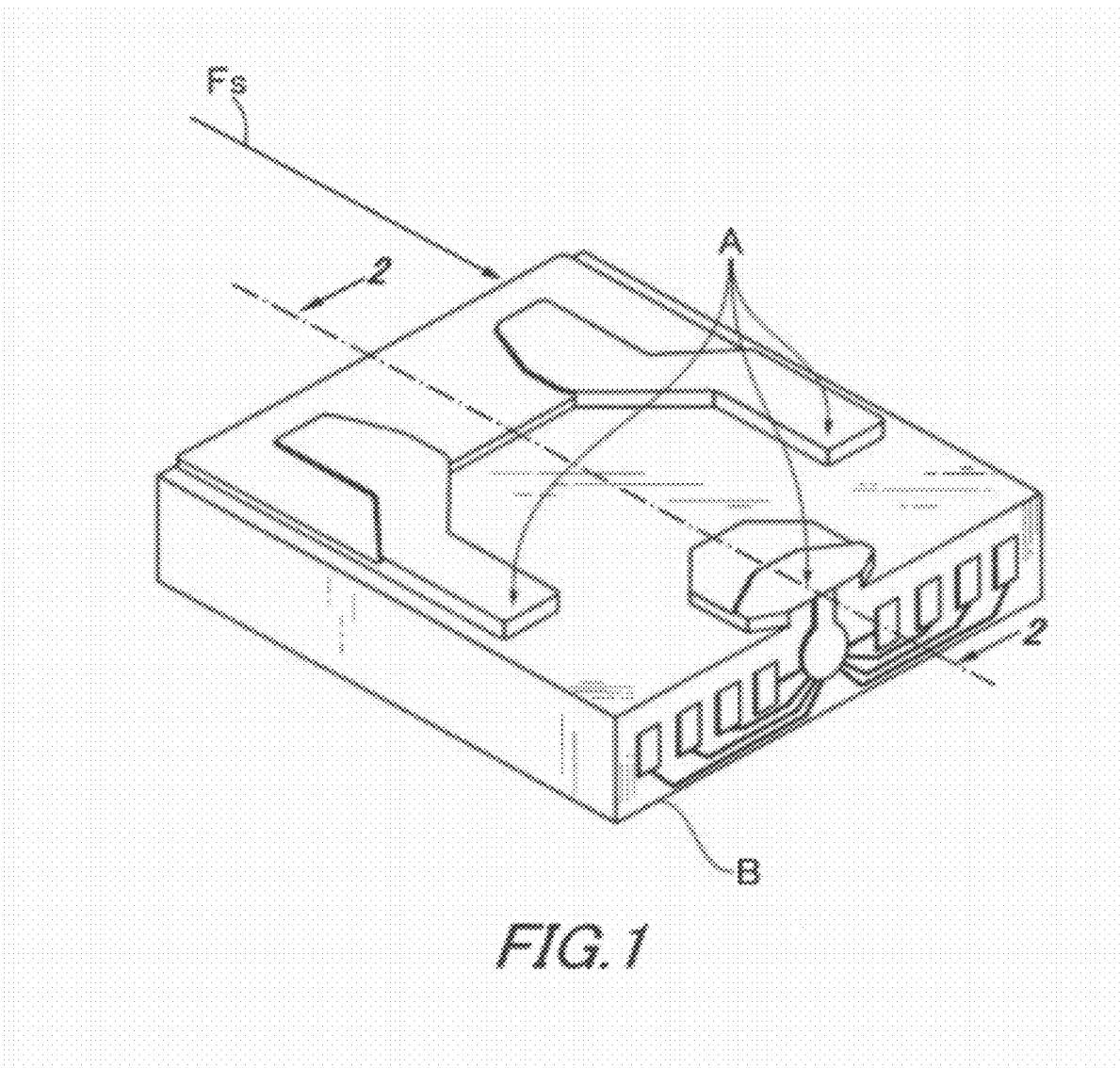
FIG. 1 is a perspective view of a magnetic head according to the present invention.

FIG. 1 shows an exemplary appearance of a magnetic head according to the present invention. The magnetic head has a slider substrate B of a generally rectangular prism structure and an air bearing surface A directly relating to floating characteristics. The air bearing surface A is configured to generate a pressure for floating the magnetic head utilizing viscosity of fluid flow Fs generated by rotation of a magnetic disk.

Figure 2:
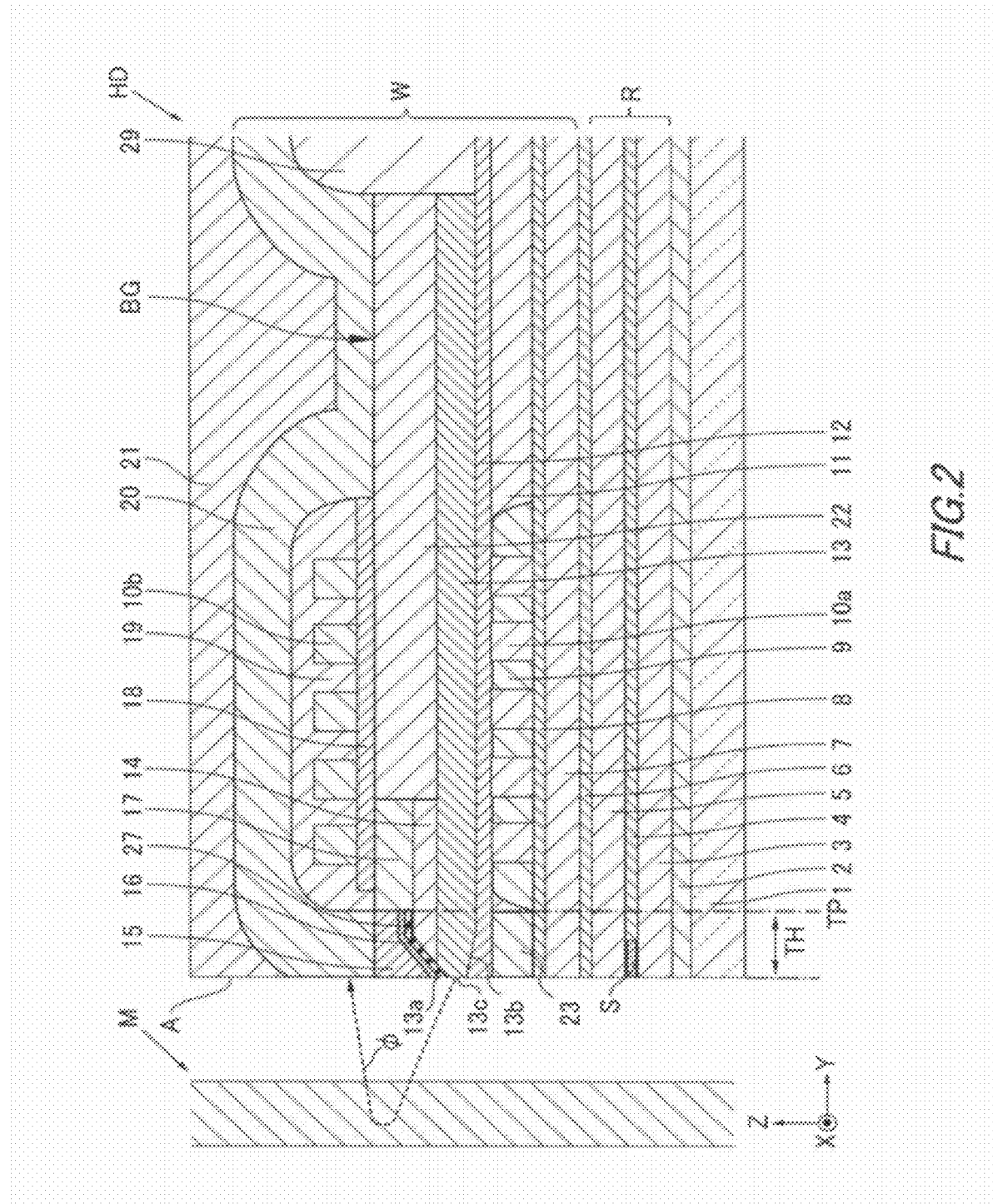
FIG. 2 is a partial sectional view taken along line 2-2 in FIG. 1.

FIG. 2 shows a section taken along line 2-2 in FIG. 1. Referring to this figure, the layer structure of the magnetic head HD will be described below.

In the following description, dimensions along the X, Y, and Z axes shown in the figure are designated "width", "length", and "thickness", respectively. Along the Y axis, moreover, one side close to the magnetic medium-facing surface A and the other side remote therefrom are designated "front" and "rear", respectively. Furthermore, upper and lower sides in the figure are designated "trailing side" and "leading side", respectively.

The magnetic head HD is formed by stacking, on a substrate 1, an insulating layer 2, a reproducing head R using magneto-resistive effect (MR), a separating layer 6, a recording head W for performing a recording process in a perpendicular recording system, and an overcoat layer 21 in the named order. The air bearing surface A is one side face shared by these elements and opposed to a surface of a magnetic recording medium M.

The substrate 1 is made of a ceramic material such as AlTiC ($Al_2O_3 \cdot TiC$) or the like. The insulating layer 2, the separating layer 6, and the overcoat layer 21 are made of a non-magnetic insulating material such as aluminum oxide or the like. The aluminum oxide may be alumina ($Al_2O_3$) or the like.

The reproducing head R is formed by stacking a lower read shield layer 3, a shield gap layer 4, and an upper read shield layer 5 in the named order. In the shield gap layer 4, a reproducing element S is embedded with one end face exposed on the magnetic medium-facing surface A.

Both the lower read shield layer 3 and the upper read shield layer 5 magnetically separate the reproducing element S from the surroundings and extend rearward from the magnetic medium-facing surface A. The lower read shield layer 3 and the upper read shield layer 5 are made of a magnetic material such as nickel-iron alloy (NiFe). The nickel-iron alloy may be permalloy, for example. Here, the lower read shield layer 3 and the upper read shield layer 5 may have a single layer structure or a multilayer structure in which a non-magnetic layer made of a non-magnetic insulating material such as ruthenium (Ru) or alumina is sandwiched between a pair of magnetic layers made of a magnetic material such as permalloy, for example.

Moreover, the shied gap layer 4 electrically separates the reproducing element S from the surroundings and is made of a non-magnetic insulating material such as alumina. The reproducing element S is an element having a giant magneto-resistive effect (GMR) or a tunneling magneto-resistive effect (TMR), and typically a TMR element may be employed.

On the other hand, the recording head W includes a magnetic layer 7, a leading shield layer 23, a main magnetic pole layer 13, a non-magnetic layer 14, a yoke layer 22, a trailing shield layer 15, a trailing gap layer 16, a second magnetic layer 27, thin film coils 10a, 10b, a return path magnetic pole layer 20, and insulating layers 8, 9, 11, 12, 17, 18, 19, 29.

The magnetic layer 7 serves as a return path on the leading side and is made of a magnetic material such as NiFe or CoNiFe. With this magnetic layer 7, a part of a magnetic flux ϕ emitted from the main magnetic pole layer 13 can be dispersed toward the leading side to reduce a WATE effective magnetic field. The WATE effective magnetic field refers to an effective magnetic field which has an effect on a wide area of adjacent tracks (for example, within the area of 2 to 10 lanes from a target track for writing).

The thin film coils 10a, 10b are made of a highly conductive material such as copper into a spiral shape and generate a recording magnetic field according to information to be recorded on the magnetic recording medium M. Spaces between windings of the lower coil layer 10a are filled with the insulating layer 9, which is further surrounded by the insulating layer 11, and on its front side, there is formed the leading shield layer 23. On the other hand, spaces between windings of the upper coil layer 10b are filled with the insulating layer 19, and on its leading side, there is formed the insulating layer 18.

The insulating layers 9, 19 are made of a non-magnetic insulating material such as photoresist or spin-on glass (SOG), while the insulating layers 11, 12, 18 are made of a non-magnetic insulating material such as alumina. These insulating layers 9, 11, 12, 18, 19 electrically separate the thin film coils 10a, 10b from the surroundings.

The main magnetic pole layer 13 is made of a magnetic material with a high saturation density such as iron-cobalt alloy or iron-cobalt-nickel alloy and has a pole tip 13c exposed on the recording medium-facing surface A and extends rearward from the pole tip 13c. The main magnetic pole layer 13 emits the magnetic flux ϕ from the recording medium-facing surface A into the magnetic recording medium M with the recording magnetic field generated from the thin film coils 10a, 10b.

The non-magnetic layer 14 is made of a non-magnetic material such as ruthenium and laid on the main magnetic pole layer 13. Furthermore, the insulating layer 17, which is made of a non-magnetic insulating material such as alumina, is laid on the non-magnetic layer 14. The insulating layer 17 has a front end face which defines a throat height TH and a throat height zero position TP.

The trailing shield layer 15 mainly has a function of increasing the perpendicular magnetic field gradient and is laid over the main magnetic pole layer 13 and the non-magnetic layer 14 with the trailing gap layer 16 and the second magnetic layer 27 between. The trailing shield layer 15 is preferably made of a magnetic material having a high saturation magnetic flux density such as cobalt-nickel-iron alloy, nickel-iron alloy or iron-based alloy.

The trailing gap layer 16 is made of a non-magnetic material such as alumina and magnetically separates the main magnetic pole layer 13 and the trailing shield layer 15.

The second magnetic layer 27 is disposed beneath the trailing shield layer 15 and is made of a magnetic material having a high saturation magnetic flux density such as iron, nickel or cobalt-iron alloy.

Figure 3:
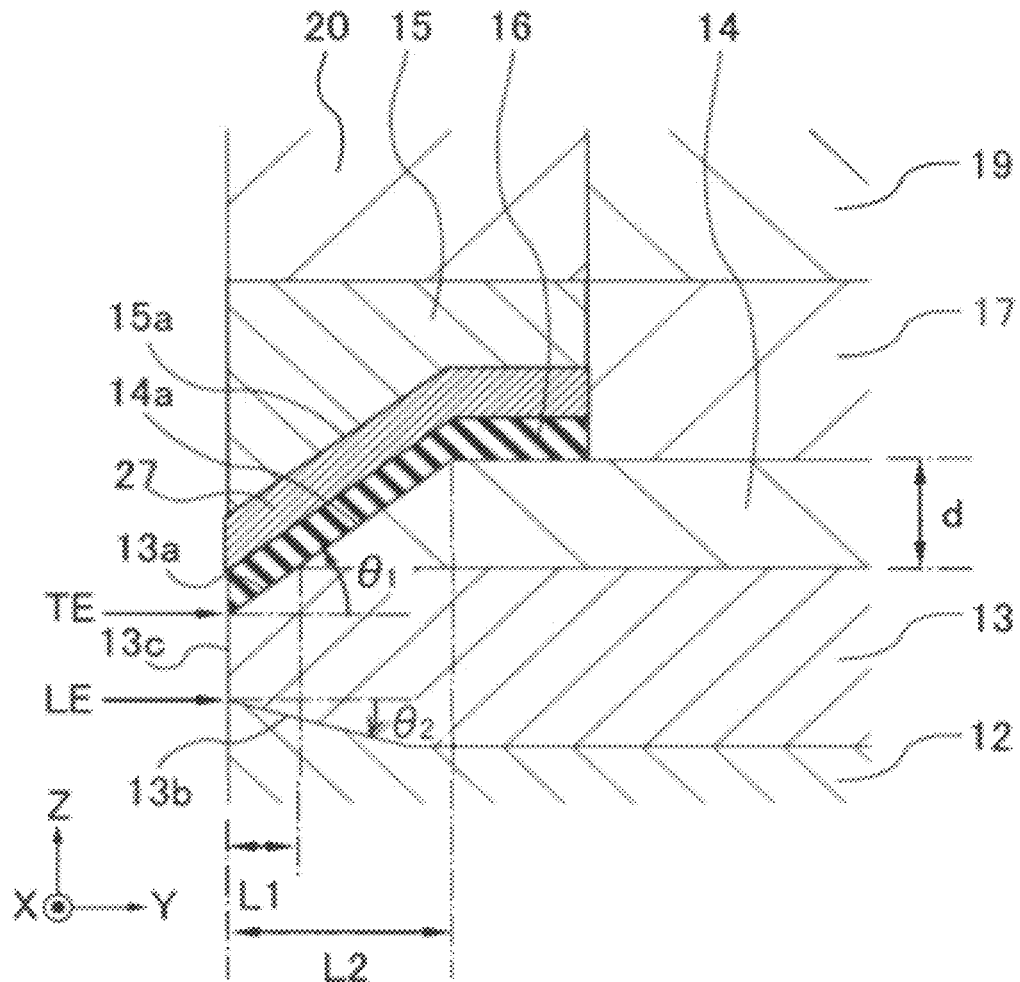
FIG. 3 is an enlarged view of FIG. 2 near a main magnetic pole layer on the side of a magnetic medium-facing surface.

FIG. 3 shows an enlarged view of FIG. 2 near the main magnetic pole layer 13 on the side of the magnetic medium-facing surface A. The main magnetic pole layer 13 and the non-magnetic layer 14 have a continuous tapered face 13a, 14a opposed to a lower side 15a of the trailing shield layer 15. The tapered face 13a, 14a extends from the trailing edge TE of the pole tip 13c at a constant inclination angle $\theta_1$. In other words, the tapered face 13a of the main magnetic pole layer 13 and the tapered face 14a of the non-magnetic layer 14 form a single continuous slope of a constant inclination angle $\theta_1$.

Here, the angle $\theta_1$ may be properly set, for example, within the range of 15 to 30 degrees. In addition, a distance L1 between the magnetic medium-facing surface A and a rear end of the tapered face 13a of the main magnetic pole layer 13 is, for example, 120 (nm), while a distance L2 between the magnetic medium-facing surface A and a rear end of the tapered face 14a of the non-magnetic layer 14 is, for example, 270 (nm). Moreover, a thickness d of the non-magnetic layer 14 is, for example, 70 (nm). However, these values are mere examples and may be determined properly depending on design.

With this configuration, a part of the tapered face 13a, 14a is formed of the non-magnetic layer 14, which makes it possible to reduce an area of the tapered face 13a of the main magnetic pole layer 13 opposed to the lower side 15a of the trailing shield layer 15. Therefore, a leakage magnetic flux flowing from the main magnetic pole layer 13 to the trailing shield layer 15 can be minimized by properly setting the above-described parameters L1, L2, d, or the like.

Moreover, the end 14a of the non-magnetic layer 14 on the side of the magnetic medium-facing surface A becomes a part of the tapered face 13a, 14a. Therefore, as compared with the case where the above-mentioned end 14a is not a tapered face but an end face generally parallel to the magnetic medium-facing surface A, it is possible to increase a volume of the trailing shield layer 15.

A tolerance of the trailing shield layer 15 for magnetic saturation can be improved by suppressing the leakage magnetic flux to the trailing shield layer 15 and increasing the volume of the trailing shield layer 15, as described above, so that an excellent magnetic field gradient can be obtained to improve the bit error rate.

The main magnetic pole layer 13 also has a second tapered face 13b extending from the leading edge LE of the pole tip 13c. Here, an inclination angle $\theta_2$ of the second tapered face 13b with respect to the lamination plane (X-Y plane) may be properly set within the range of about 15 to 60 degrees. The second tapered face 13b reduces the thickness of the main magnetic pole layer 13, concentrating the magnetic flux of the magnetic field emitted from the main magnetic pole layer 13.

Figure 4:
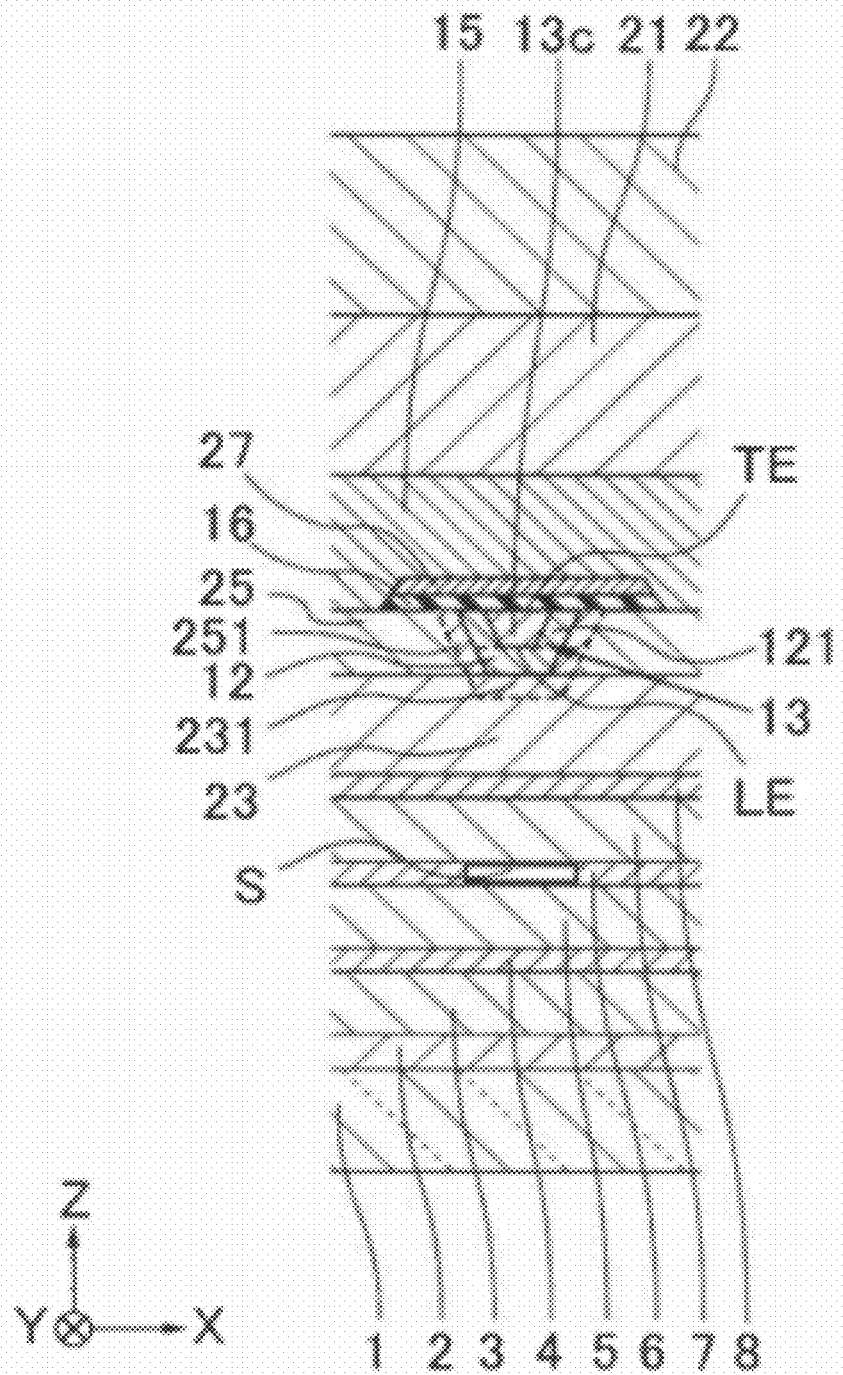
FIG. 4 is a partial plan view of a magnetic medium-facing surface of a magnetic head.

FIG. 4 shows a layer structure on the magnetic medium-facing surface A in a front view. The pole tip 13c has an inverted trapezoid shape, wherein a trailing edge TE has a larger width than a leading edge LE. The upper side of the inverted trapezoid shape, i.e., the trailing edge TE is a substantial recording portion of the main magnetic pole layer 13, and its width defines the recording track width. Typically, the recording track width is approximately 0.2 µm or less.

Moreover, the main magnetic pole layer 13 is enclosed by the leading shield layer 23 on the leading side, by the side shields 25 on both sides in the lamination plane, and by the trailing shield layer 15 on the trailing side. The leading shield layer 23, the trailing shield layer 15, and the side shields 25 are made of, for example, a magnetic material similar to that of the main magnetic pole layer 13 and absorbs the magnetic flux mainly in the vicinity of the magnetic medium-facing surface A to prevent dispersion of the magnetic flux. This increases the magnetic field gradient and also narrows the recording track width.

The leading shield layer 23, the trailing shield layer 15, and the side shields 25 are each exposed on the magnetic medium-facing surface A and extend from the exposed end face to the throat height zero position TP behind it. The trailing shield layer 15 and the side shields 25 are adjacent to the insulating layer 17 at each rear end.

The leading shield layer 23 is formed to be opposed to the leading side of the main magnetic pole layer 13 across the insulating layer 12. The leading shield layer 23 is not an essential component for the magnetic head and may be provided if necessary.

The side shields 25 are formed to sandwich the main magnetic pole layer 13 from both sides with a pair of side gaps 121 between. The pair of side gaps 121 are made of an insulating material and extend from the insulating layer 12 toward the trailing side along both sides of the pole tip 13c, thereby magnetically separating the main magnetic pole layer 13 and the side shields 25.

In the side shields 25 and the leading shield layer 23, portions 251, 231 having a lower saturation magnetic flux density than other portions are provided adjacent to the side gaps 121 and the insulating layer 12, respectively. The portions 251, 231 can be obtained, for example, by applying an alloy whose composition ratio is different from that of other portions and have an effect of increasing the above-described magnetic field gradient while suppressing the WATE effective magnetic field as compared with the case where they are formed with a uniform saturation magnetic flux density.

The trailing gap layer 16 and the second magnetic layer 27 are provided only in the vicinity of the upper side of the pole tip 13c as seen from the magnetic medium-facing surface A. This prevents excessive dispersion of the magnetic flux $\phi$ emitted from the pole tip 13c.

As shown in FIG. 2, the magnetic flux $\phi$ emitted from the pole tip 13c can be absorbed by the trailing shield layer 15 and the return path magnetic pole layer 20 through a soft under layer and the like of the magnetic recording medium M.

Figure 5:
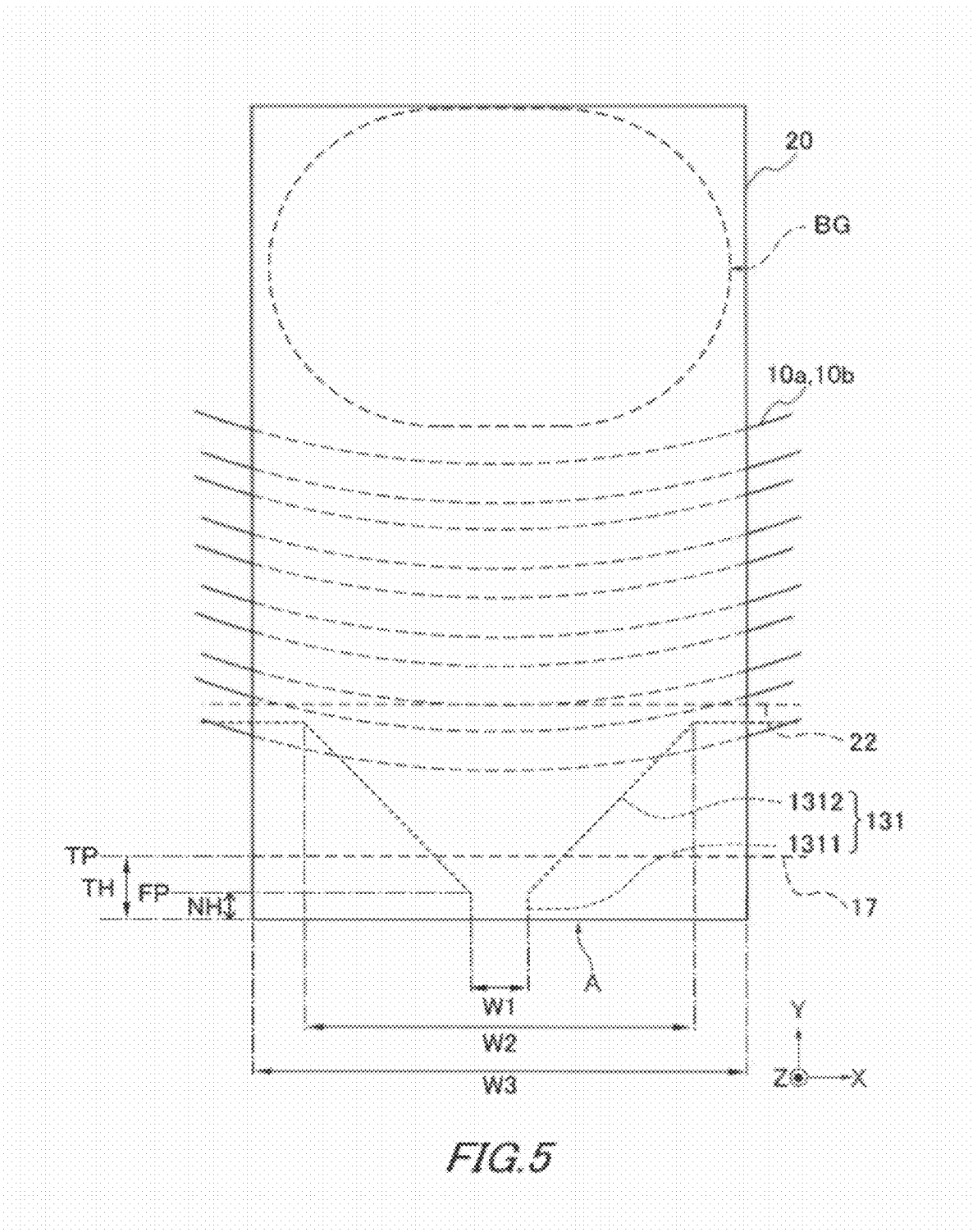
FIG. 5 is a plan view of a return path magnetic pole layer and a main magnetic pole layer as seen from a lamination plane.

FIG. 5 shows the return path magnetic pole layer 20 as seen from the lamination plane (X-Y plane) of the magnetic head. The return path magnetic pole layer 20 has a rectangular plan shape of a width W3 and is made of, for example, a magnetic material similar to that of the trailing shield layer 15 to have a function of circulating the magnetic flux.

On the trailing side of the trailing shield layer 15, the return path magnetic pole layer 20 has an end face exposed on the magnetic medium-facing surface A and extends from it over the upper coil layer 10a and the insulating layer 19 to a back gap BG. That is, the return path magnetic pole layer 20 is connected to the trailing shield layer 15 at the front and then connected to the rear part of the yoke layer 22 at the rear through the back gap BG so as to return the magnetic flux $\phi$ of the recording magnetic field to the main magnetic pole layer 13. However, the function of circulating the magnetic field may be provided not only to the return path magnetic pole layer 20 but also to the trailing shield layer 15 and the side shields 25.

As indicated by dotted lines in FIG. 5, moreover, a magnetic pole front part 131 of the main magnetic pole layer 13 on the side of the magnetic medium-facing surface A includes a first tip part 1311 which has a constant width W1 being the recording track width and a second tip part 1312 whose track width increases rearward from the width W1 to a width W2. The position at which the width starts to increase is defined as flare point FP and the distance between the flare point FP and the magnetic medium-facing surface A is defined as neck height NH.

The yoke layer 22 is made of a magnetic material similar to or different from that of the main magnetic pole layer 13 and is directly laid on the main magnetic pole layer 13 behind the non-magnetic layer 14, as shown in FIG. 2. Thus, the yoke layer 22 serves as an auxiliary magnetic flux storage area for supplying a magnetic flux to the main magnetic pole layer 13. In addition, the yoke layer 22 is connected to the non-magnetic layer 14 and the insulating layer 17 at a front end and connected to the insulating layer 29 at a rear end along with a rear end of the main magnetic pole layer 13. The insulating layer 29 is made of a non-magnetic insulating material such as alumina and disposed between a rear part of the return path magnetic pole layer 20 and a rear part of the insulating layer 12.

Figure 6:
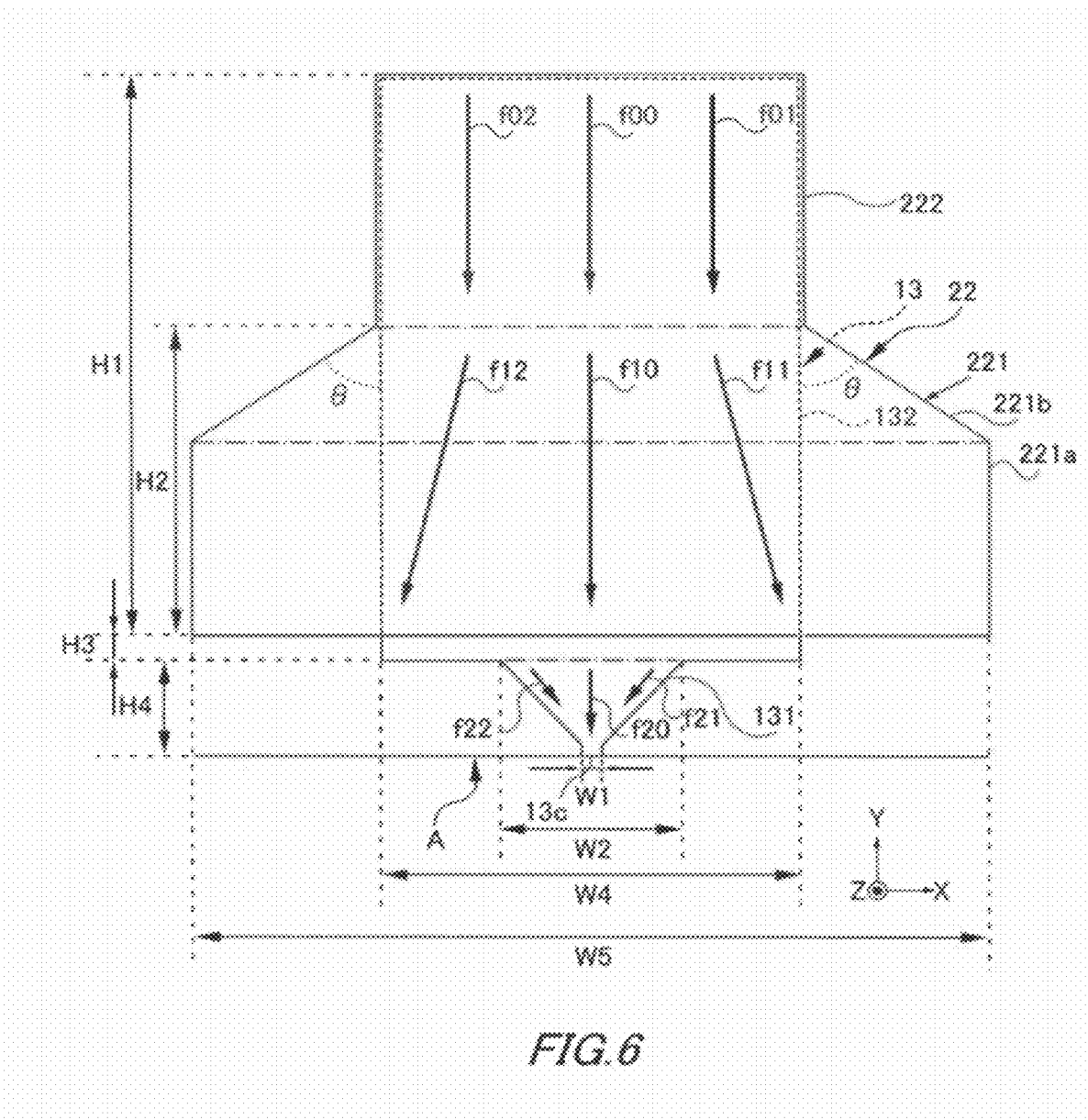
FIG. 6 is a plan view of a main magnetic pole layer and a yoke layer as seen from a lamination plane.

The characteristic feature of the magnetic head according to the present invention resides in the shape of the yoke layer 22 and the shape of the main magnetic pole layer 13 in the lamination plane. FIG. 6 shows the shape of the main magnetic pole layer 13 and the shape of the yoke layer 22 as seen from the lamination plane of the magnetic head.

In addition to the above-mentioned magnetic pole front part 131, the main magnetic pole layer 13 includes a magnetic pole rear part 132 extending behind the magnetic pole front part 131. The magnetic pole rear part 132 has a rectangular shape with a constant width W4 in the track width direction. On the other hand, the magnetic pole front part 131 extends on the magnetic medium-facing surface A side of the magnetic pole rear part 132, and its width in the track width direction is smaller than that of the magnetic pole rear part 132 and decreases from the width W2 to the width W1 toward the magnetic medium-facing surface A, as described above.

On the other hand, the yoke layer 22 is disposed at the magnetic pole rear part 132 and includes a yoke front part 221 and a yoke rear part 222. The yoke rear part 222 is connected to the return path magnetic pole layer 20 and has the same constant width W4 in the track width direction as the magnetic pole rear part 132. The width W4 of the yoke rear part 222 in the track width direction may be equal to or different from the width of the magnetic pole rear part 132 and, moreover, is not required to be constant, as will be described later.

The yoke front part 221 extends on the magnetic medium-facing surface A side of the yoke rear part 222 and has a width W5 in the track width direction which is larger than that of the yoke rear part 222. That is, these widths satisfy the relationship of W5>W4.

More specifically, the yoke front part 221 includes a rectangular first area 221a and a trapezoidal second area 221b.

The first area 221a extends on the magnetic medium-facing surface A side of the second area 221b and has a constant width W5 in the track width direction. The second area 221b widens with a width in the track width direction increasing toward the magnetic medium-facing surface A from the same width W4 as the yoke rear part 222 to the same width W5 as the first area 221a. In other words, both ends of the second area 221b in the track width direction are inclined at a certain spread angle θ with respect to the Y axis in the figure.

Moreover, a magnetic medium-facing surface A side end of the magnetic pole rear part 132 is located a distance H3 forward of a magnetic medium-facing surface A side end of the yoke front part 221. On the other hand, the yoke rear part 221 and the magnetic pole rear part 132 have aligned ends on the side remote from the magnetic medium-facing surface A in the height direction (along the Y axis). However, whether these ends should be aligned or not should be determined depending on the design.

The magnetic head according to the present invention comprises the main magnetic pole layer 13 capable of generating a magnetic flux φ of a recording magnetic field, the yoke layer 22 laid on the main magnetic pole layer 13, and the return path magnetic pole layer 20 connected to the yoke rear part 222 in such a manner as to return the magnetic flux φ of the recording magnetic field to the main magnetic pole layer 13. Thus, they constitute a magnetic circuit having a path through which the magnetic flux φ of the recording magnetic field goes back to the return path magnetic pole layer 20, from the main magnetic pole layer 13, through the external magnetic recording medium M and then goes back to the main magnetic pole layer 13 through the yoke layer 22.

The yoke rear part 222 in the present embodiment has the same constant width W4 in the track width direction as the magnetic pole rear part 132, favorably acting to direct magnetic fluxes f00 to f02 of the magnetic pole rear part 132 uniformly toward the magnetic pole front part 131. However, it goes without saying that even if the width W4 of the magnetic pole rear part 132 is not constant, such an effect can be produced to some degree.

Since the width W1, W2 of the magnetic pole front part 131 in the track width direction is smaller than that of the magnetic pole rear part 132 and decreases toward the magnetic medium-facing surface A, magnetic fluxes f20 to f22 from the magnetic pole rear part 132 can be concentrated toward the end face 13c on the magnetic medium-facing surface A side. This increases the strength of a recording magnetic field flowing from the magnetic medium-facing surface A to the magnetic recording medium M, thereby improving magnetic saturation characteristics.

In the vicinity of the magnetic medium-facing surface A, moreover, since the width W5 of the yoke front part 221 in the track width direction is larger than that of the magnetic pole rear part 132 and that of the yoke rear part 222, a part f11 and f12 of magnetic fluxes f10 to f12 flowing from the magnetic pole rear part 132 to the magnetic pole front part 131 can be dispersed toward both ends in the track width direction or the vicinity thereof. Thus, at the magnetic pole front part 131, the magnetic fluxes f20 to f22 can be prevented from excessively concentrating on the end face 13c on the magnetic medium-facing surface side.

Therefore, the magnetic head according to the present invention can reduce the strength of a recording magnetic field to be applied to tracks adjacent to a target track for writing. This can clearly be understood by comparing the magnetic head according to the present invention with a conventional magnetic head.

Figure 7:
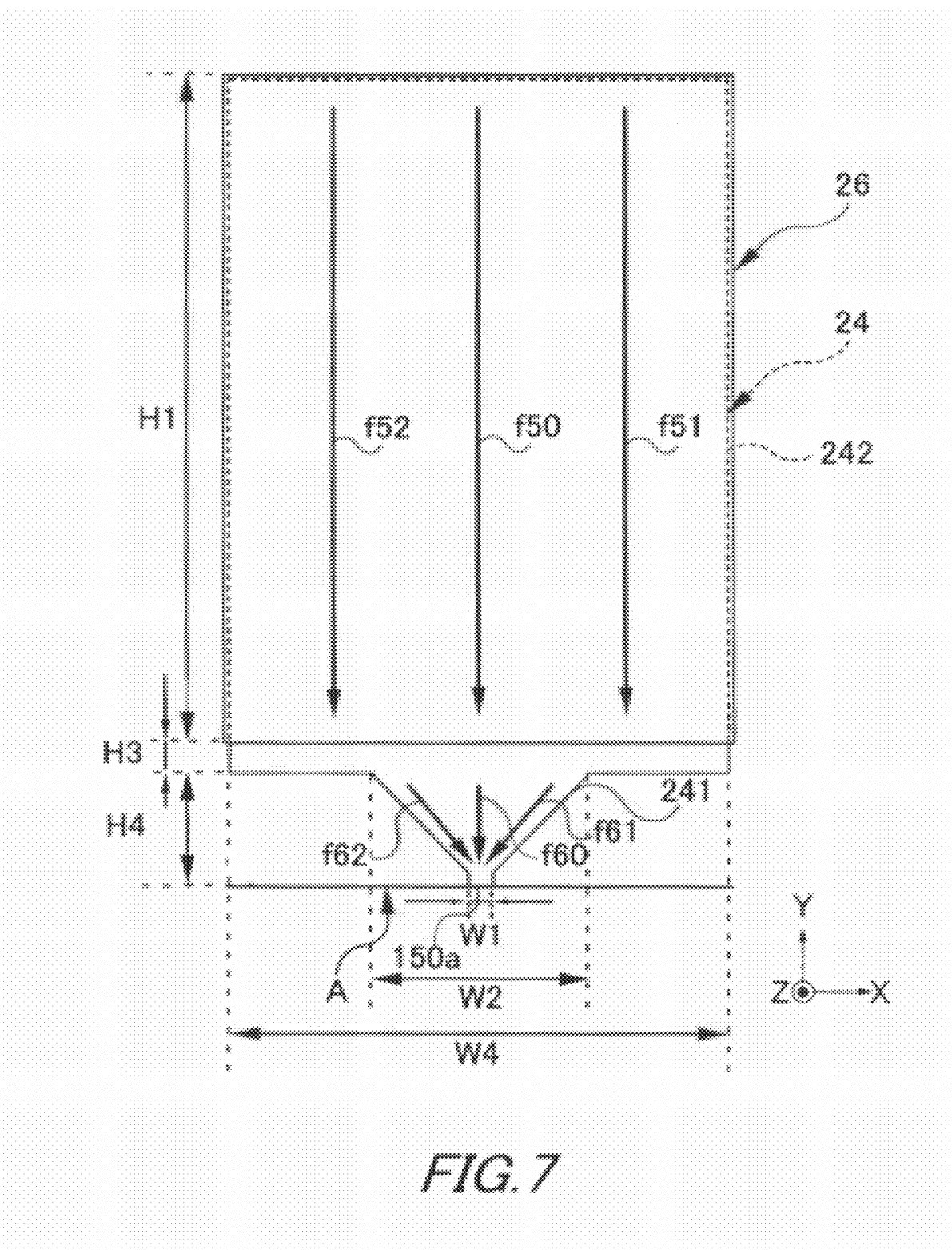
FIG. 7 a plan view of a main magnetic pole layer and a yoke layer of a conventional magnetic head as seen from a lamination plane.

FIG. 7 is a plan view of a main magnetic pole layer and a yoke layer of a conventional magnetic head as seen from a lamination plane. A main magnetic pole layer 24 of the conventional magnetic head has substantially the same structure as the foregoing main magnetic pole layer 13. That is, the main magnetic pole layer 24 includes a magnetic pole rear part 242 having a constant width W4 in the track width direction and a magnetic pole front part 241 having a width W2 in the track width direction which decreases toward the magnetic medium-facing surface A. On the other hand, a yoke layer 26 of the conventional magnetic head has a constant width W4 in the track width direction unlike the present invention.

In the conventional magnetic head, magnetic fluxes f50 to f52 in the magnetic pole rear part 152 are uniformly directed toward the magnetic pole front part 151 without being dispersed. Therefore, magnetic fluxes f60 to f62 in the magnetic pole front part 151 are excessively concentrated on a pole tip 150a, thereby increasing the risk of WATE, as described above. In fact, as a result of the magnetic field analysis performed by the present inventors, remarkable magnetic saturation of the trailing shield and the leading shield has been observed in the conventional magnetic head. On the other hand, such magnetic saturation could not have been observed in the magnetic head according to the present invention.

Figure 8:
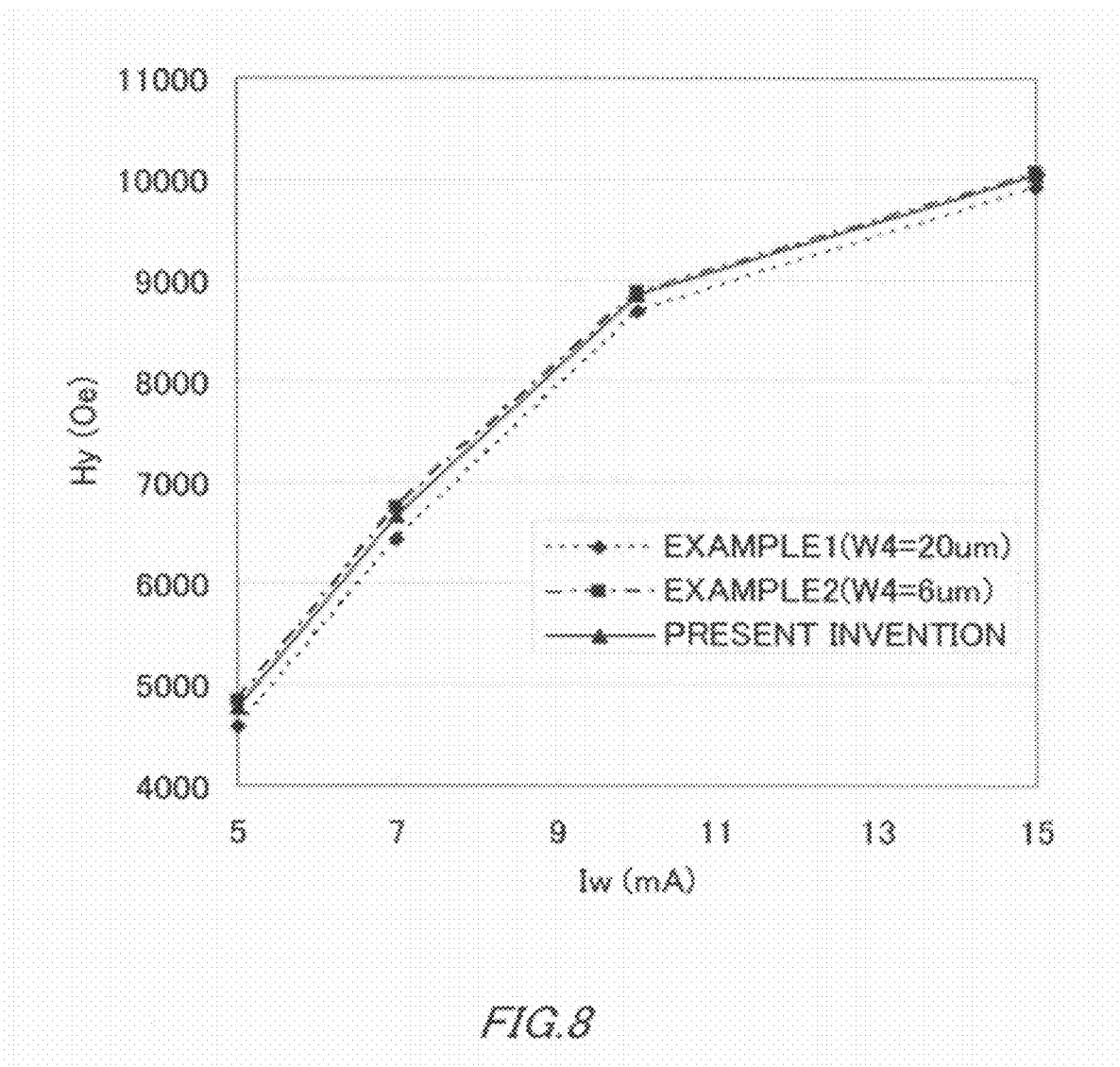
FIG. 8 is a characteristic graph of a write magnetic field strength with respect to a write current, comparing a magnetic head according to the present invention with a conventional magnetic head.
Figure 9:
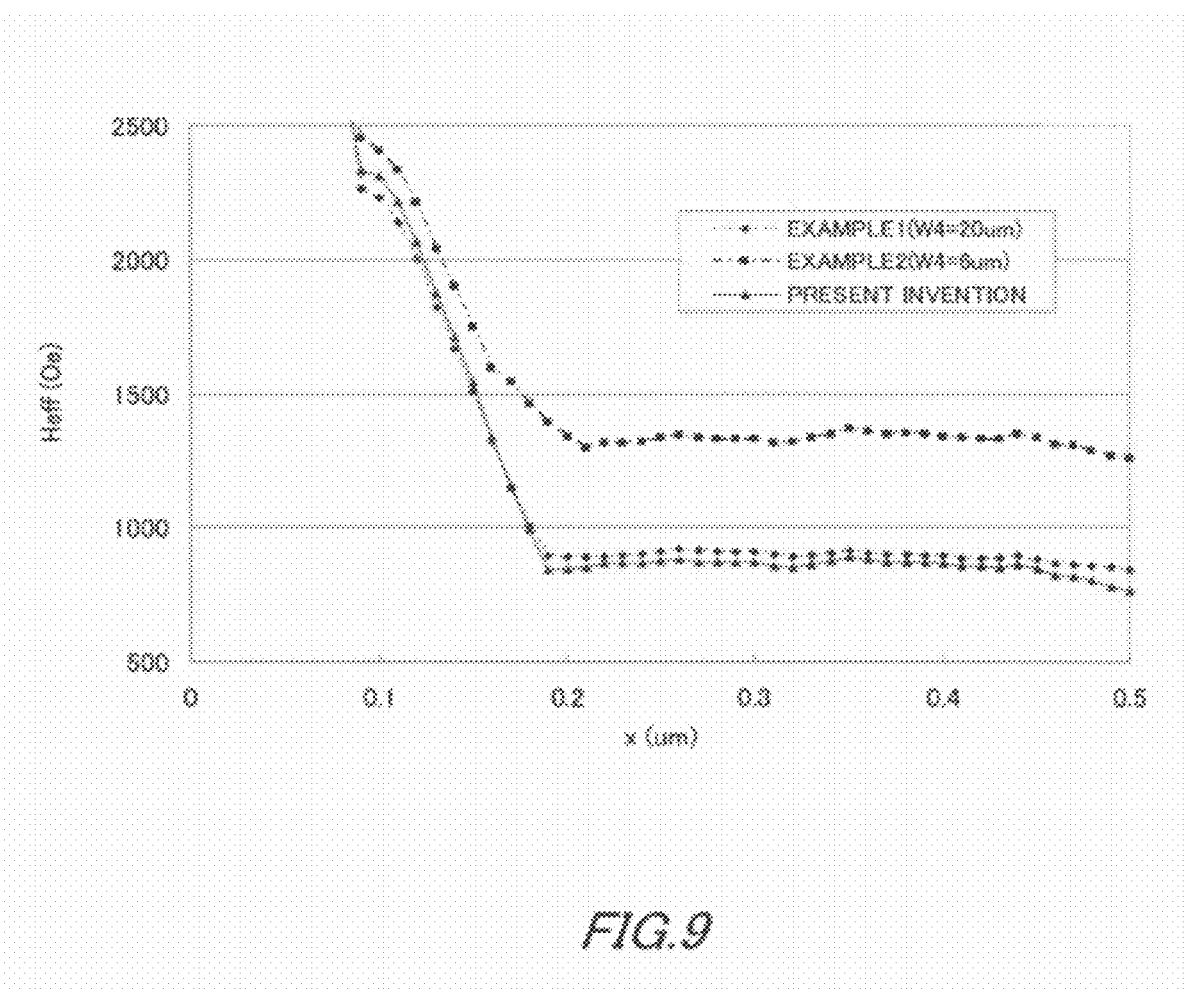
FIG. 9 is a characteristic graph of a write magnetic field strength with respect to a distance from a target track for writing, comparing a magnetic head according to the present invention with a conventional magnetic head.

Next will be described characteristics of the magnetic head according to the present invention in comparison with characteristics of a conventional magnetic head. FIG. 8 is a characteristic graph of a write magnetic field strength Hy(Oe) with respect to a write current Iw(mA), comparing the magnetic head according to the present invention with the conventional magnetic head. On the other hand, FIG. 9 is a characteristic graph of a write magnetic field strength Heff (Oe) with respect to a distance x(μm) from a target track for writing, comparing the magnetic head according to the present invention with the conventional magnetic head.

Dimensions of the magnetic head (see FIG. 6) according to the present invention and used for such characteristic analyses were as follows.

The recording track width W1=70 (nm)
The width W2 of the rear end of the magnetic pole front part 131=2.2 (μm)
The width W4 of the magnetic pole rear part 132 and the yoke rear part 222=6 (μm)
The width W5 of the yoke front part 221=11 (μm)
The overall length H1 of the yoke layer 22=8 (μm)
The length H2 of the yoke front part 221=4.7 (μm)
The distance H3 between the end of the yoke front part 221 and the end of the magnetic pole rear part 132=0.4 (μm)
The length H4 of the magnetic pole front part 131=1.7 (μm)
The spread angle θ of the yoke front part 221=60 (deg.)

The conventional magnetic head is represented by a comparative example 1 (EXAMPLE 1) in which the width W4 of the magnetic pole rear part 152 and the yoke layer 140 was set at 20 (μm) and a comparative example 2 (EXAMPLE 2) in which the width W4 was set at 6 (μm). The other dimensions of the comparative examples 1, 2 were the same as those of the magnetic head according to the present invention. In the figures, measurement results are represented by diamond marks (♦), rectangular marks (■), and triangular marks (▲) for the comparative example 1, the comparative example 2, and the magnetic head according to the present invention, respectively.

As understood from FIG. 8, the magnetic head according to the present invention and the magnetic head of the comparative example 2 always had a higher magnetic field strength in a low current range than that of the comparative example 1.

This shows that the magnetic saturation characteristics of the magnetic head with respect to the write current can be improved by reducing the width, as described above.

A remarkable effect of the present invention can be found in the WATE characteristics shown in FIG. 9. As understood from the figure, the magnetic head of the comparative example 2 had a higher strength of a recording magnetic field to be applied to tracks adjacent to a target track for writing than that of the comparative example 1. This shows that reducing the width W4 of the magnetic head improves the magnetic saturation characteristics with respect to the write current but increases the risk of WATE, as described above.

On the other hand, the magnetic head according to the present invention had as low a magnetic field strength as that of the comparative example 1. Of course, this comes from the characteristic shape of the yoke layer 22 thus far described.

Figure 10:
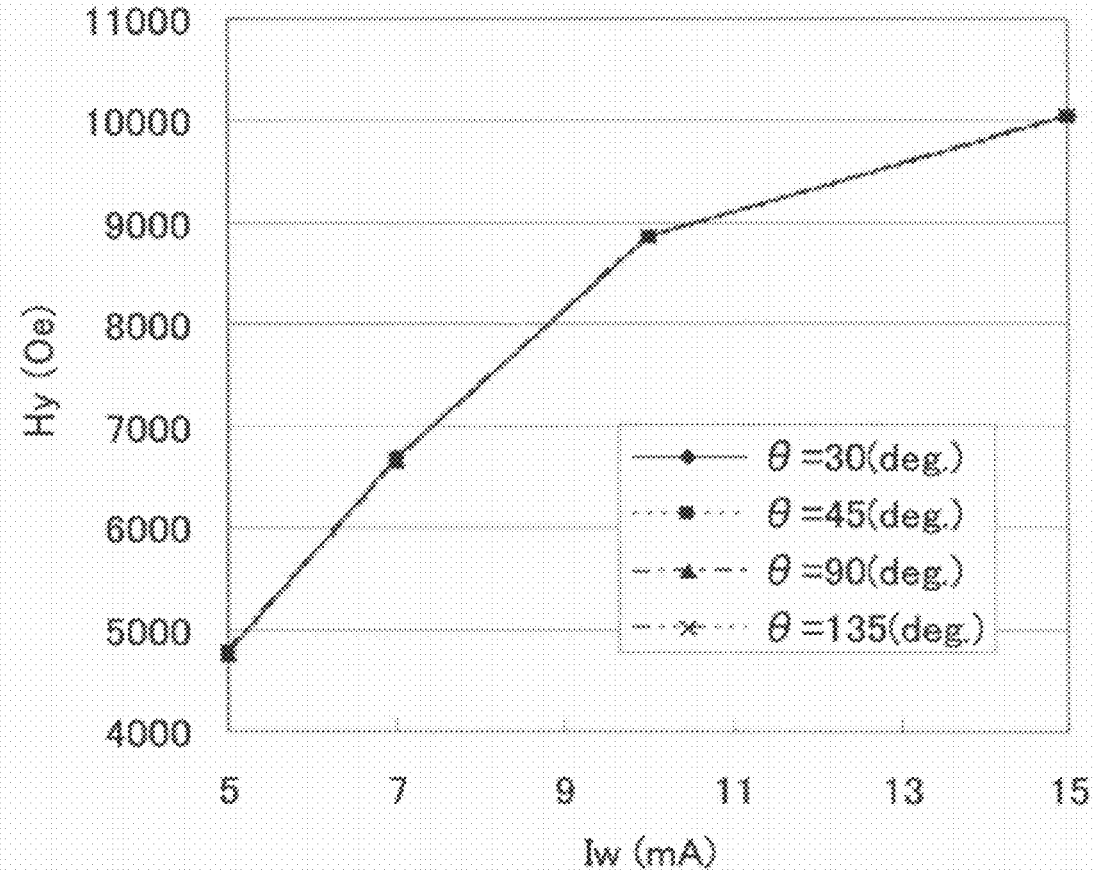
FIG. 10 is a characteristic graph of a write magnetic field strength with respect to a write current when a spread angle of a second area of a yoke front part is varied.
Figure 11:
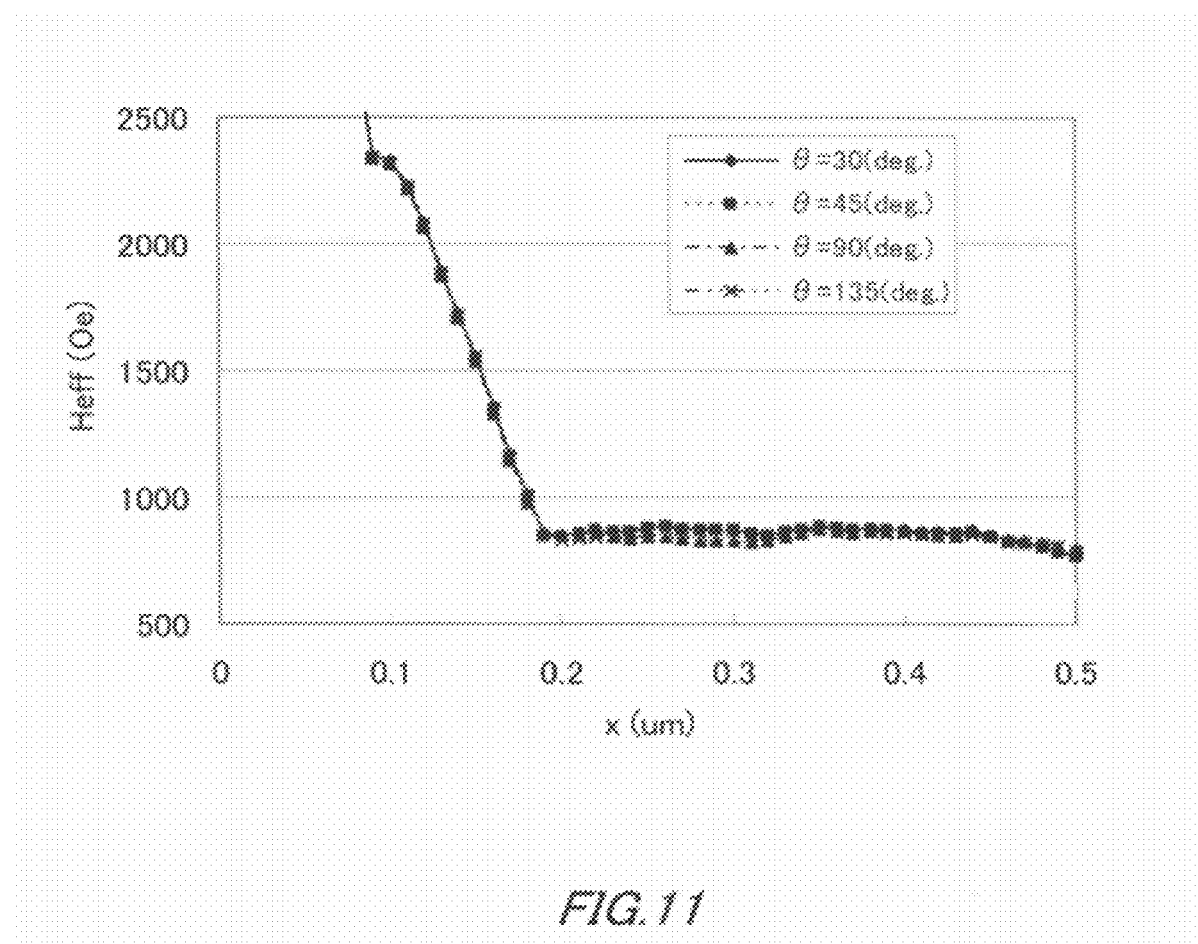
FIG. 11 is a characteristic graph of a write magnetic field strength with respect to a distance from a target track when a spread angle of a second area of a yoke front part is varied.

Next will be described how the above characteristics can be affected by the dimensions of the yoke layer 22. FIG. 10 is a characteristic graph of a write magnetic field strength Hy(Oe) with respect to a write current Iw(mA) when the spread angle θ was varied. FIG. 11 is a characteristic graph of a write magnetic field strength Heff(Oe) with respect to a distance x(μm) from a target track when the spread angle θ was varied.

Here, the spread angle θ was set at 30 (deg.), 45 (deg.), 90 (deg.), and 135 (deg.), for example. The other dimensions had the same values as described above.

Figure 12:
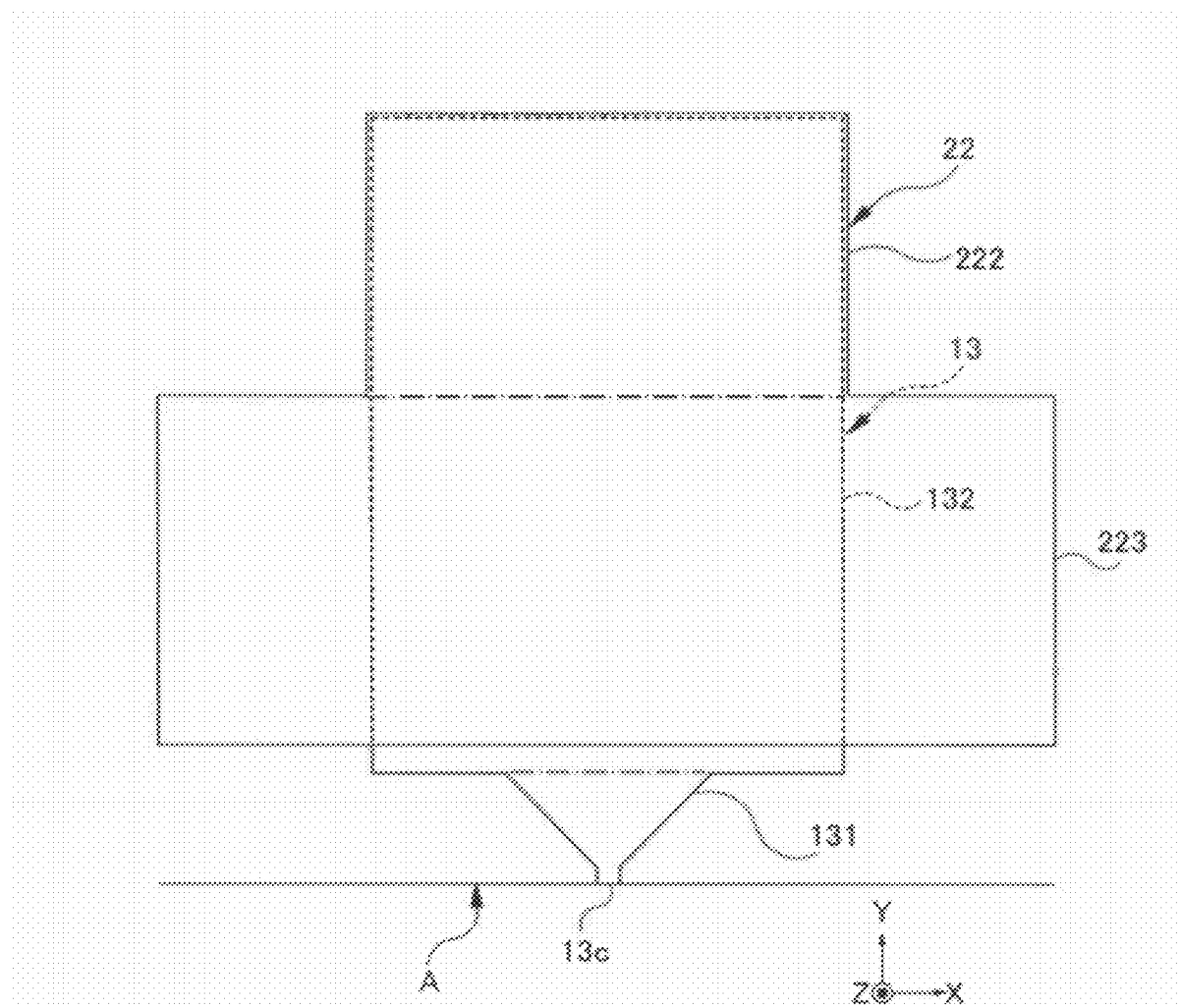
FIG. 12 is a plan view of a main magnetic pole layer and a yoke layer as seen from a lamination plane of a magnetic head according to another embodiment.

As understood from these figures, the characteristics were not affected by varying the spread angle θ. Presumably, this is because the characteristics are dominantly affected by the width W5 of the yoke front part 221. Therefore, for example, the yoke layer 22 may have a simpler form as shown in FIG. 12 by setting the spread angle θ at 90 (deg.). In this case, the width of a yoke front part 223 in the track width direction has a constant value W5.

Figure 13:
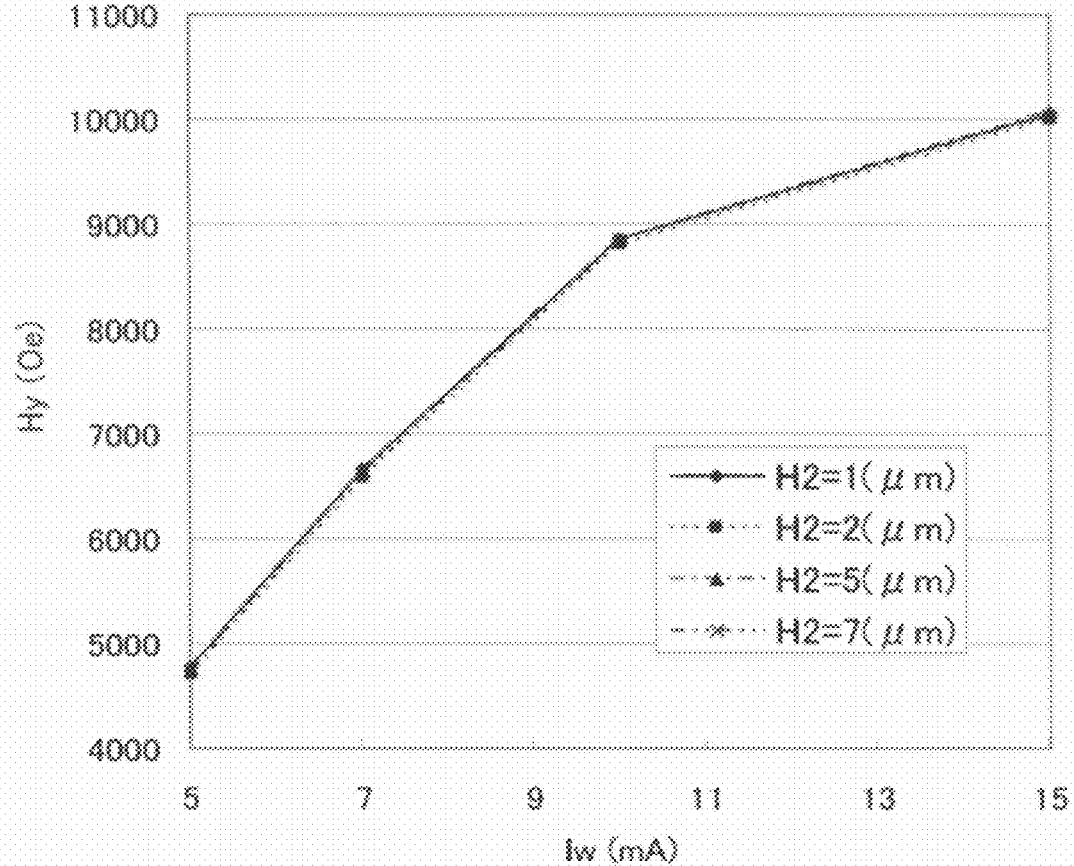
FIG. 13 is a characteristic graph of a write magnetic field strength with respect to a write current when a length of a yoke front part in a height direction is varied.
Figure 14:
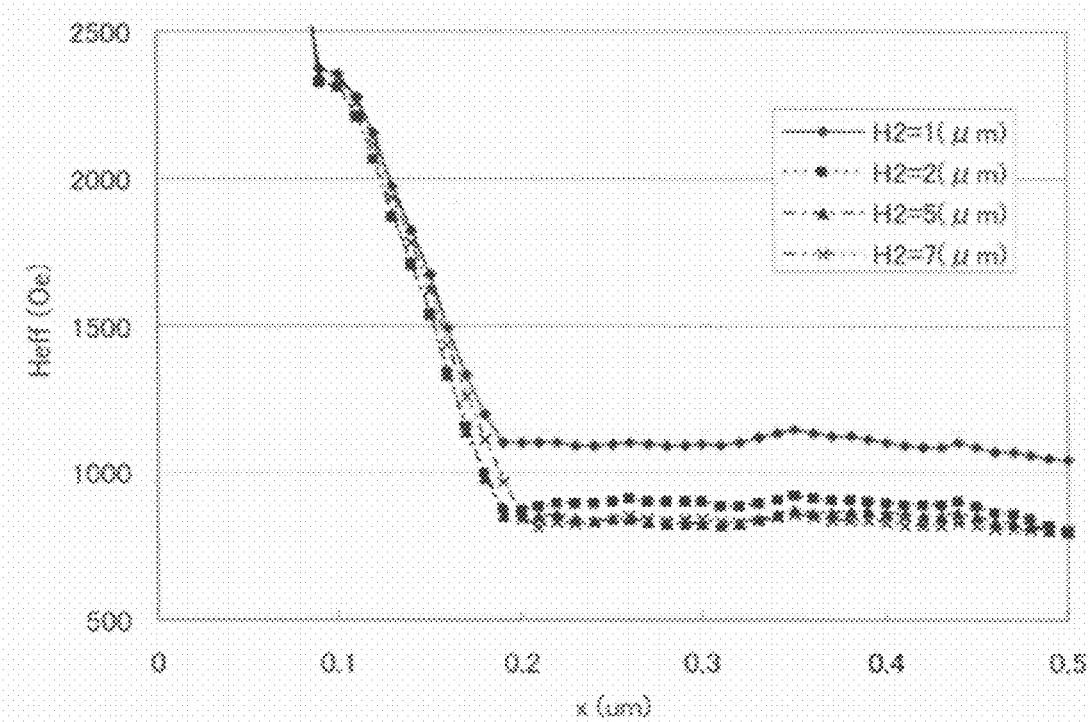
FIG. 14 is a characteristic graph of a write magnetic field strength with respect to a distance from a target track when a length of a yoke front part in a height direction is varied.

Next, FIGS. 13 and 14 show the above characteristics when the length H2 of the yoke front part 221 was set at different values of 1 (μm), 1 (μm), 5 (μm), and 7 (μm). Here, the spread angle θ was 90 (deg.), and the other dimensions had the same values as described above.

As understood from FIG. 13, the characteristics of the write magnetic field strength with respect to the write current were not affected by varying the length H2. However, as understood from FIG. 14, the magnetic field strength to adjacent tracks was increased when the length H2 was 1 (μm). Therefore, preferably, the length H2 of the yoke front part 221 is from 2 to 7 (μm). Thus, the preferred range of a ratio of the overall length of the yoke layer 22 to the length of the yoke rear part 222 in the height direction (along the Y axis), i.e., H1:H2 is from 8:2 to 8:7.

Figure 15:
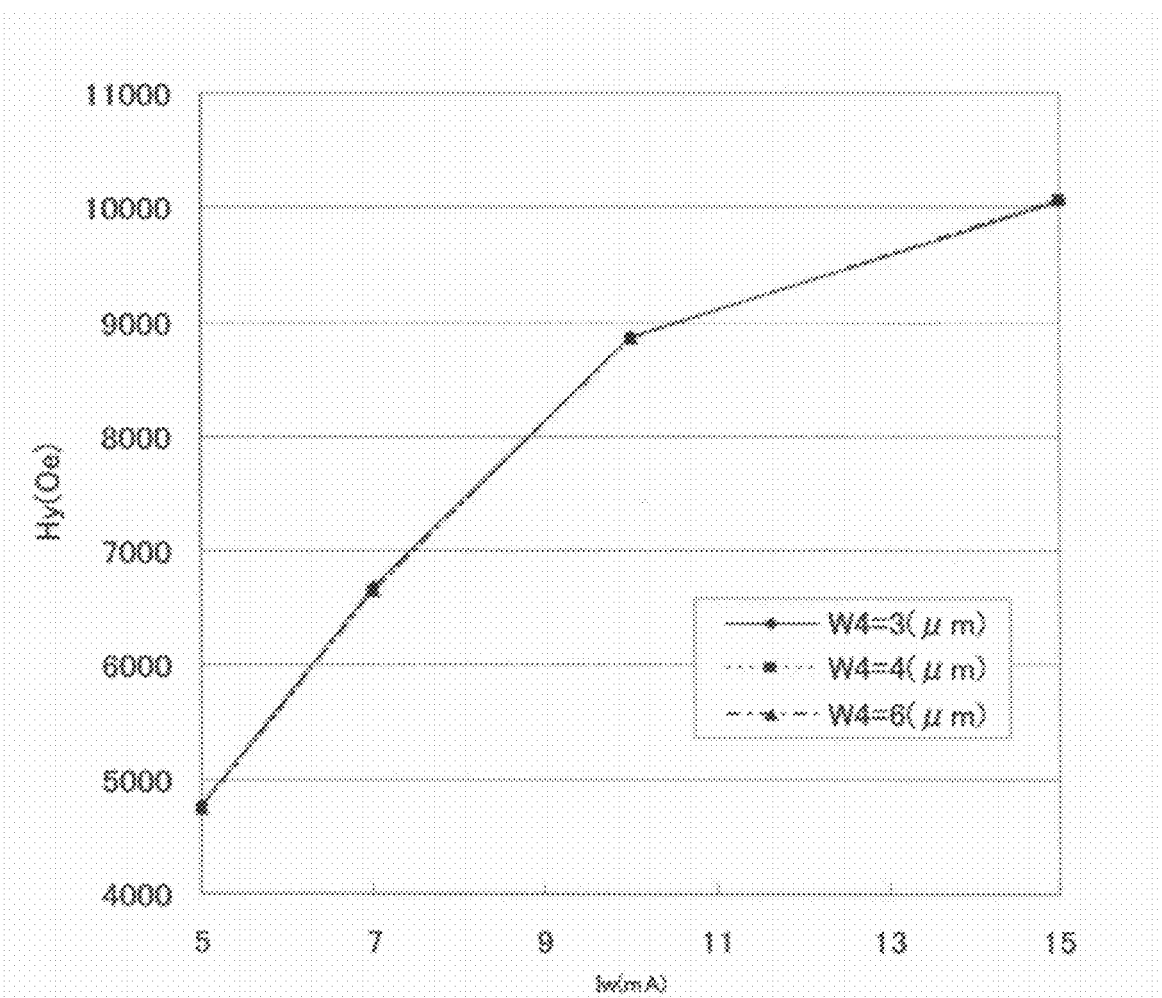
FIG. 15 is a characteristic graph of a write magnetic field strength with respect to a write current when a width of a yoke rear part in a track width direction is varied.
Figure 16:
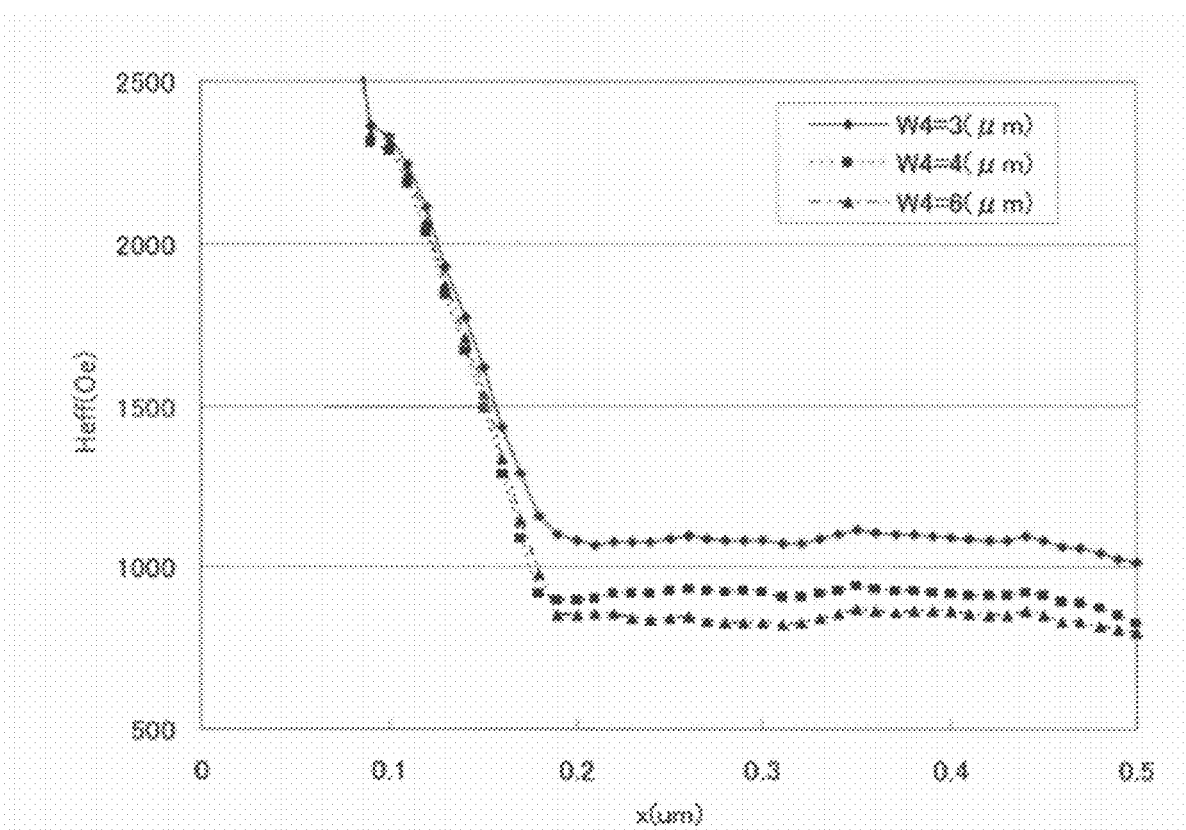
FIG. 16 is a characteristic graph of a write magnetic field strength with respect to a distance from a target track when a width of a yoke rear part in a track width direction is varied.

Next, FIGS. 15 and 16 show the above characteristics when the common width W4 of the yoke rear part 222 and the magnetic pole rear part 132 was set at different values of 3 (μm), 4 (μm), and 6 (μm). Here, the spread angle θ was 90 (deg.), and the other dimensions had the same values as described above.

As understood from FIG. 15, the characteristics of the write magnetic field strength with respect to the write current were not affected by varying the width W4. However, as understood from FIG. 16, the magnetic field strength to adjacent tracks was increased when the width W4 was 3 (μm). Therefore, preferably, the width W4 of the yoke rear part 221 and the magnetic pole rear part 132 is from 4 to 6 (μm). Thus, the preferred range of a width ratio of the yoke rear part 222 to the yoke front part 221, i.e., W4:W5 is from 6:11 to 4:11.

Figure 17:
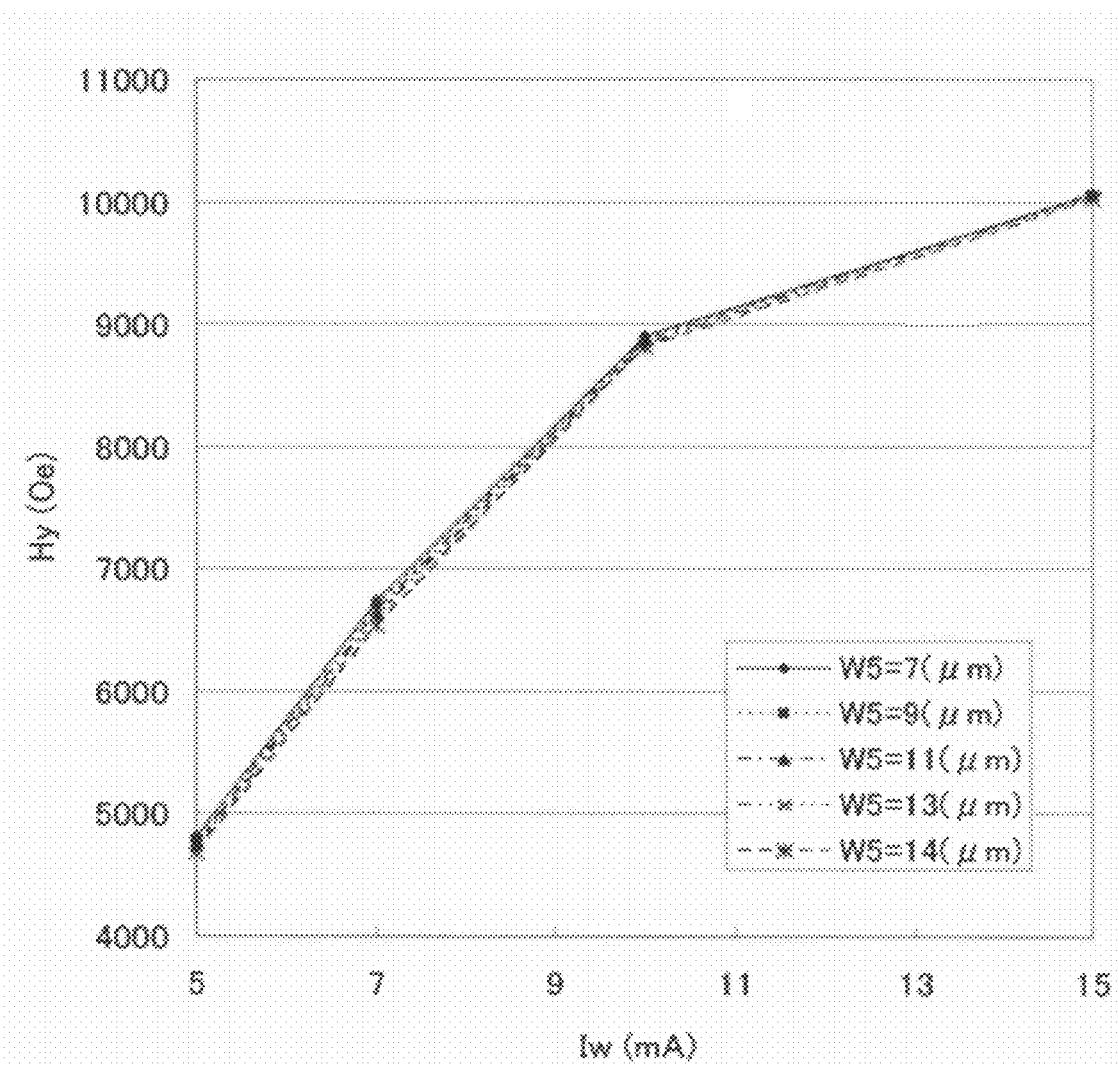
FIG. 17 is a characteristic graph of a write magnetic field strength with respect to a write current when a width of a yoke front part in a track width direction is varied.
Figure 18:
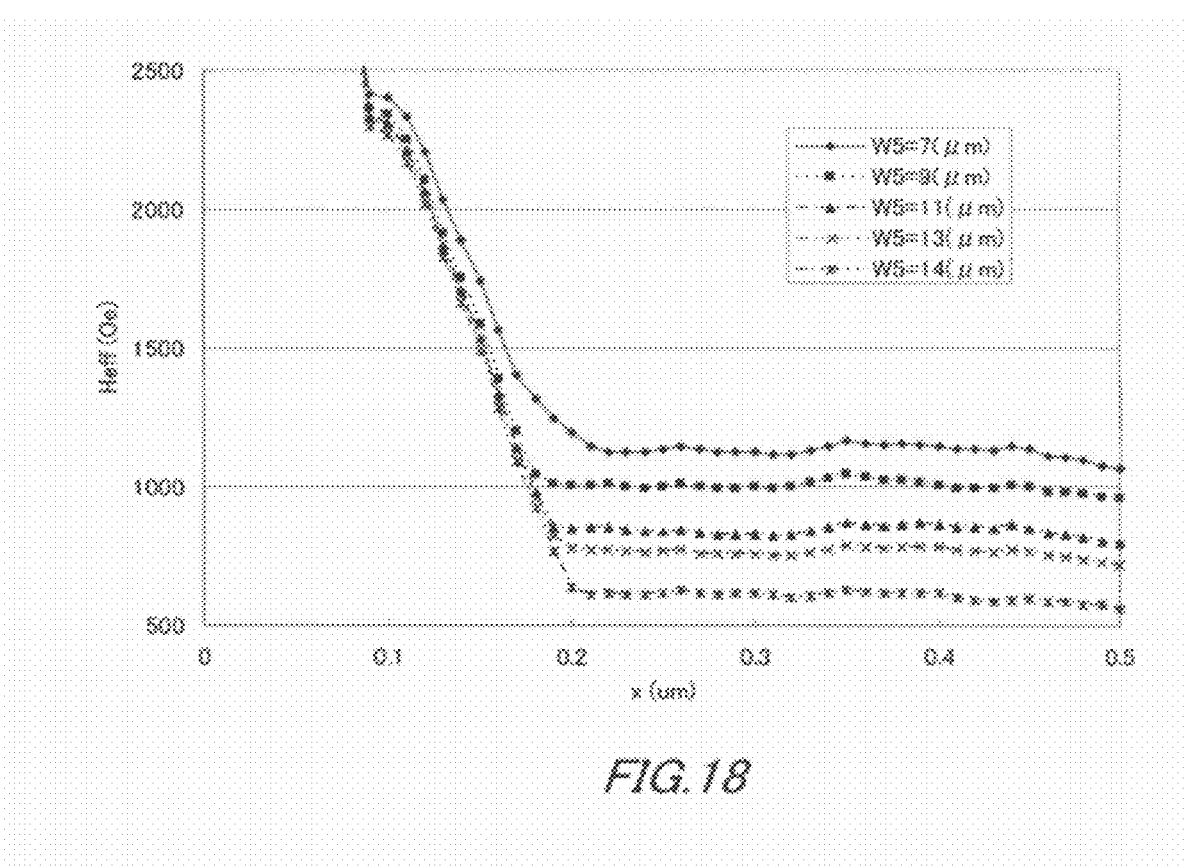
FIG. 18 is a characteristic graph of a write magnetic field strength with respect to a distance from a target track when a width of a yoke front part in a track width direction is varied.

Next, FIGS. 17 and 18 show the above characteristics when the width W5 of the yoke front part 221 was set at different values of 7 (μm), 9 (μm), 11 (μm), 13 (μm), and 14 (μm). Here, the spread angle θ was 90 (deg.), and the other dimensions had the same values as described above.

As understood from FIG. 17, the write magnetic field strength was decreased in a low current range when the width W5 was 14 (μm). As also understood from FIG. 18, the magnetic field strength to adjacent tracks was increased when the width W5 was 7 (μm) and 9 (μm). Thus, the preferred range of the width ratio of the yoke rear part 222 to the yoke front part 221, i.e., W4:W5 is from 6:11 to 6:13.

Taking the above results from FIGS. 15 and 16 into consideration, accordingly, the preferred range of the width ratio of the yoke rear part 222 to the yoke front part 221, i.e., W4:W5 is from 6:11 to 6:13. It should be noted that the optimum ratios and values thus far described may vary depending on variation in magnetic saturation characteristics along with variation in the width of the main magnetic pole or the like.

Figure 19:
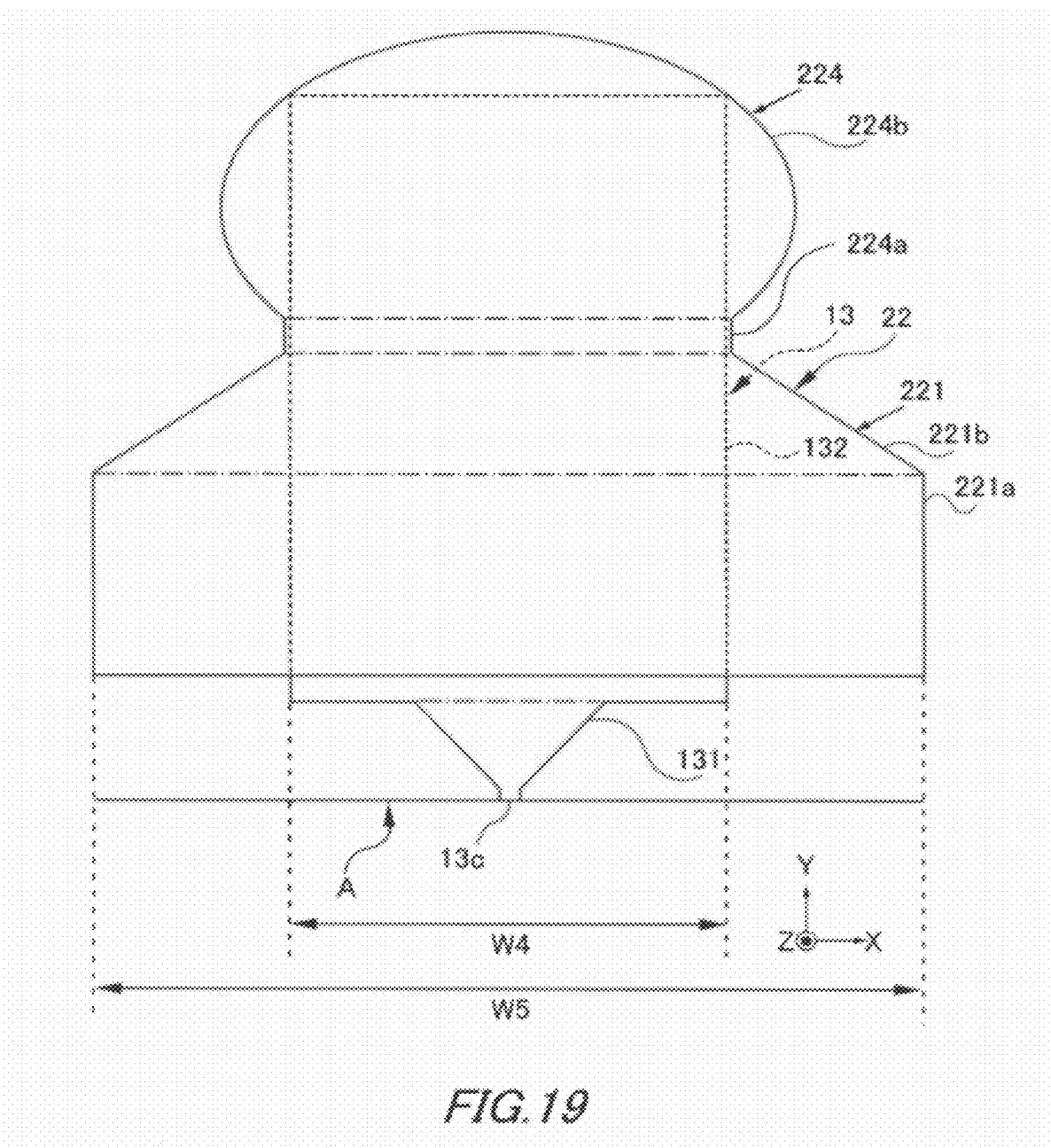
FIG. 19 is a plan view of a main magnetic pole layer and a yoke layer as seen from a lamination plane of a magnetic head according to another embodiment.
Figure 20:
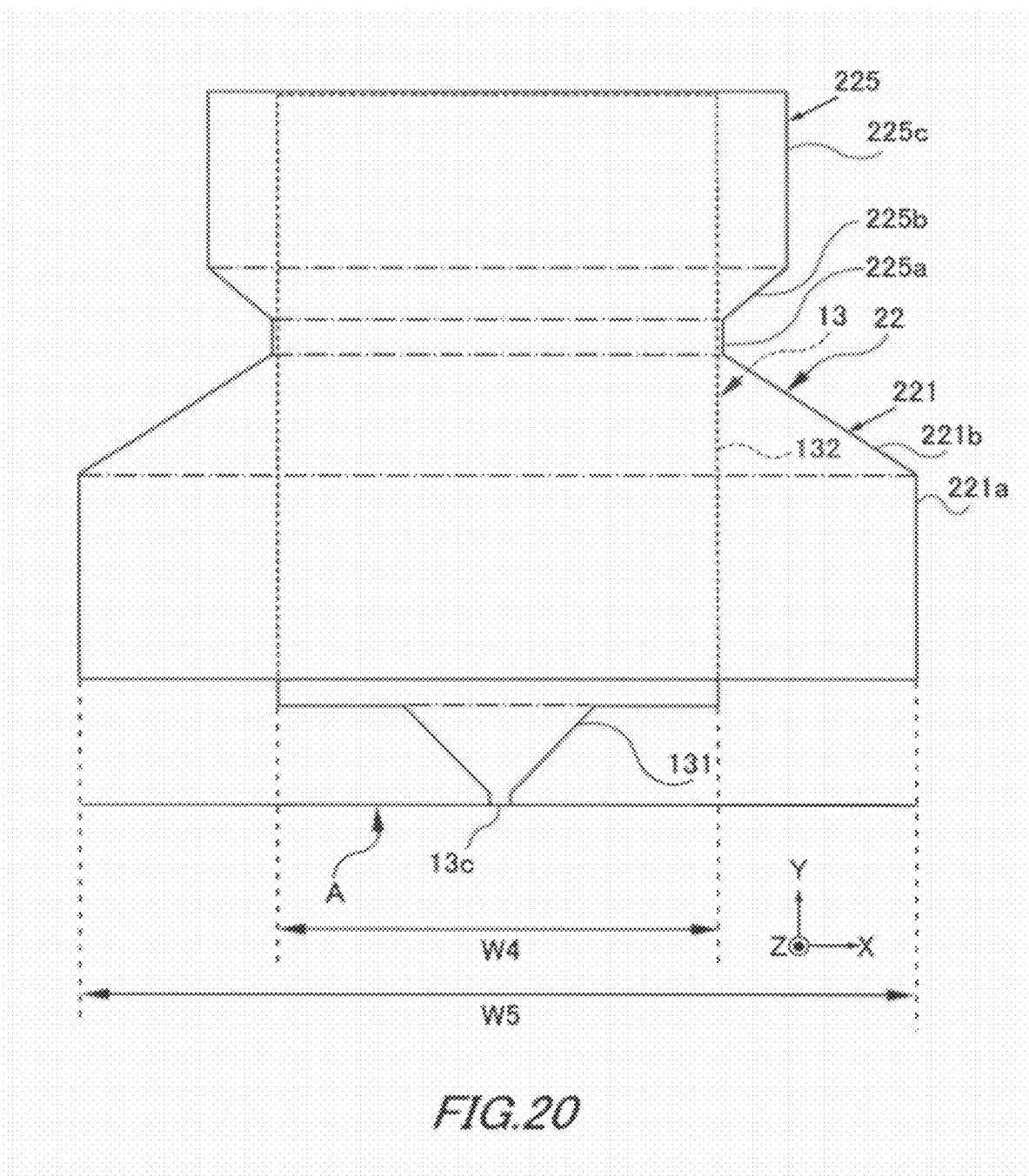
FIG. 20 is a plan view of a main magnetic pole layer and a yoke layer as seen from a lamination plane of a magnetic head according to another embodiment.

In the embodiment thus far described, the yoke rear part 222 has a constant width W4 in the track width direction, but the present invention is not limited thereto. FIGS. 19 and 20 show embodiments in which the width of a yoke rear part 224, 225 is not constant. Here, the shape of the yoke front part 221 and the shape of the main magnetic pole 13 are the same as shown in FIG. 6 and their explanations are omitted.

At first, the yoke rear part 224 shown in FIG. 19 includes a first area 224a having a constant width W4 and a second area 224b having a partially cut-off oval shape. The second area 224b is connected to the first area 224a at its cut-off section. Here, the width W5 of the yoke front part 221 is larger than the width of the magnetic pole rear part 132 and the maximum width of the second area 224b. Therefore, the yoke layer shown in FIG. 19 has the same effects as that of the foregoing embodiment.

On the other hand, the yoke rear part 225 shown in FIG. 20 includes a first area 225a having a constant width W4, a second area 225b having a trapezoidal shape whose width decreases toward the magnetic medium-facing surface A, and a third area 225c having a larger constant width than the first area 225a. The width of the second area 225b decreases from the same width as the third area 225c to the same width W4 as the first area 225a. Here, the width W5 of the yoke front part 221 is larger than the width of the magnetic pole rear part 132 and the third area 225c. Therefore, the yoke layer shown in FIG. 20 has the same effects as that of the foregoing embodiment.

The advantage of thus employing the yoke rear part 224, 225 whose width in the track width direction is not constant resides in that the shape of the yoke layer can be flexibly determined, for example, to match the shape of the back gap GP shown in FIG. 5.

In order to obtain the same advantage, it is also possible to employ a magnetic pole rear part 132 whose width in the track width direction is not constant. For example, a rear area of the magnetic pole rear part 132 as seen from the magnetic medium-facing surface may have the same shape as the yoke rear part 224 shown in FIG. 19 or the same shape as the yoke rear part 225 shown in FIG. 20. Also in this case, the yoke front part 221 should have a larger width in the vicinity of the magnetic medium-facing surface A than the magnetic pole rear part 132 so that a part of the magnetic flux flowing from the magnetic pole rear part 132 to the magnetic pole front part 131 can be dispersed toward both ends in the track width direction or the vicinity thereof.

2. Method for Manufacturing Magnetic Head

Next will be described a method for manufacturing the foregoing magnetic head HD. Processes before the production process of the magnetic head have been known and do not require specific description. Roughly speaking, it can be manufactured by forming and stacking a series of components in order using a conventional thin-film process including a film formation technique such as plating or sputtering, a patterning technique such as photolithography, an etching technique such as dry etching or wet etching, and a polishing technique such as CMP (chemical mechanical polishing).

The thin film process will be outlined with reference to FIG. 2 and so on; when manufacturing the magnetic head, at first, the insulating layer 2 is formed on the substrate 1, and then the lower read shield film 3, the shield gap film 4 embedded with the reproducing element S, and the upper read shield film 5 are stacked on the insulating layer 2 in the mentioned order, thereby forming the reproducing head R.

Subsequently, the separating layer 6 is formed on the reproducing head R, and then the magnetic layer 7, the insulating layers 8, 9, the thin film coil 10a, the leading shield layer 23, the insulating layers 11, 12, the main magnetic pole layer 13, the non-magnetic layer 14, the insulating layer 17, the trailing gap layer 16, the second magnetic layer 27, the trailing shield layer 15, the yoke layer 22, the insulating layer 18, the thin film coil 10b, the insulating layer 19, and the return path magnetic pole layer 20 are stacked on the separating layer 6 in the mentioned order, thereby forming the recording head W. Finally, the overcoat film 21 is formed on the recording head W, and then the air bearing surface A is formed by using a machining process or a polishing process, thereby completing the magnetic head.

In the above-described production process of the magnetic head, the process of forming the main magnetic pole layer 13 and the yoke layer 22 will be described in detail. FIGS. 21(a) to 21(m) illustrate events of a formation process of the main magnetic pole layer 13 in a front view of the recording medium-facing surface A.

Figure 21A:
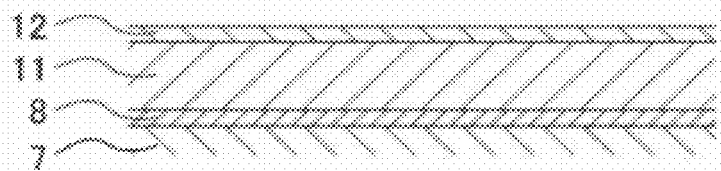

First of all, as shown in FIG. 21(a), the magnetic layer 7 and the insulating layers 8, 11, 12 are stacked in the named order.

Figure 22A:
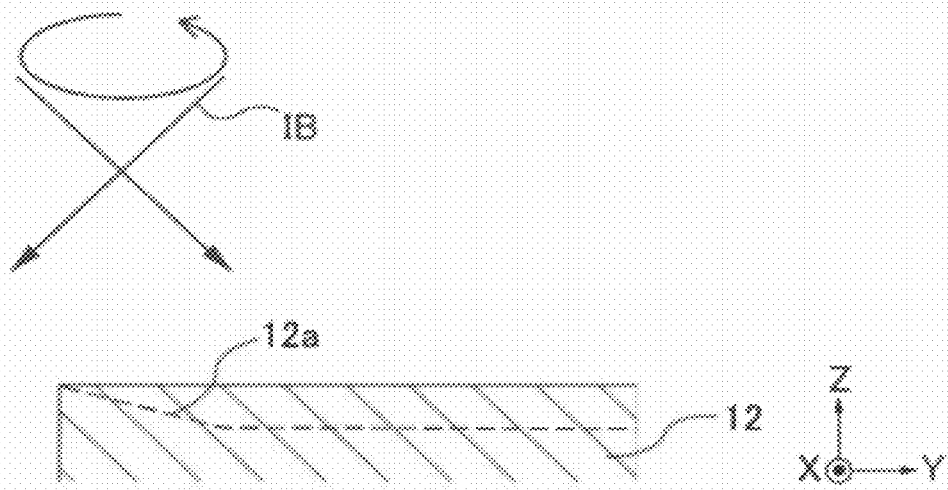
FIGS. 22(a) to 22(f) are sectional views showing a production process of a magnetic head as seen from a section in a height direction.

Then, a tapered face is formed in the insulating layer 12 in order to obtain a mold for forming the second tapered face 13b of the main magnetic pole layer 13. This event is illustrated in FIG. 22(a) as an enlarged sectional view taken along the Y-Z plane. As illustrated, the insulating layer 12 is etched by ion milling down to a position indicated by a dotted line. Ion milling is performed by irradiating ion beam IB at a certain angle while oscillating the substrate. Thus, a tapered face 12a is formed in a front area of the upper surface of the insulating layer 12 to reduce a layer thickness rearward.

Figure 21B:
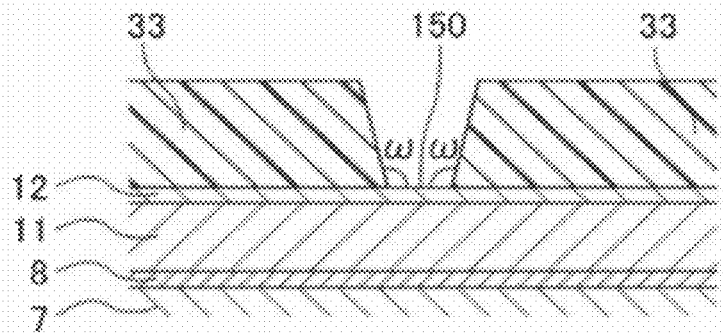

Then, as shown in FIG. 21(b), a resist pattern 33 having a recess 150 is formed on the insulating layer 12. When forming the resist pattern 33, a resist film is formed by applying a resist to the surface of the insulating layer 12, and then the resist film is subjected to patterning (exposure and development) by using a photolithography process.

At this time, exposure conditions are adjusted such that the recess 150 spreads with distance from the insulating layer 12 and an inclination angle ω of an inner wall with respect to the surface of the insulating layer 12 is equal to a bevel angle of the pole tip 13c having an inverted trapezoid shape (an exterior angle of the inverted trapezoid shape at the bottom side).

Figure 23A:
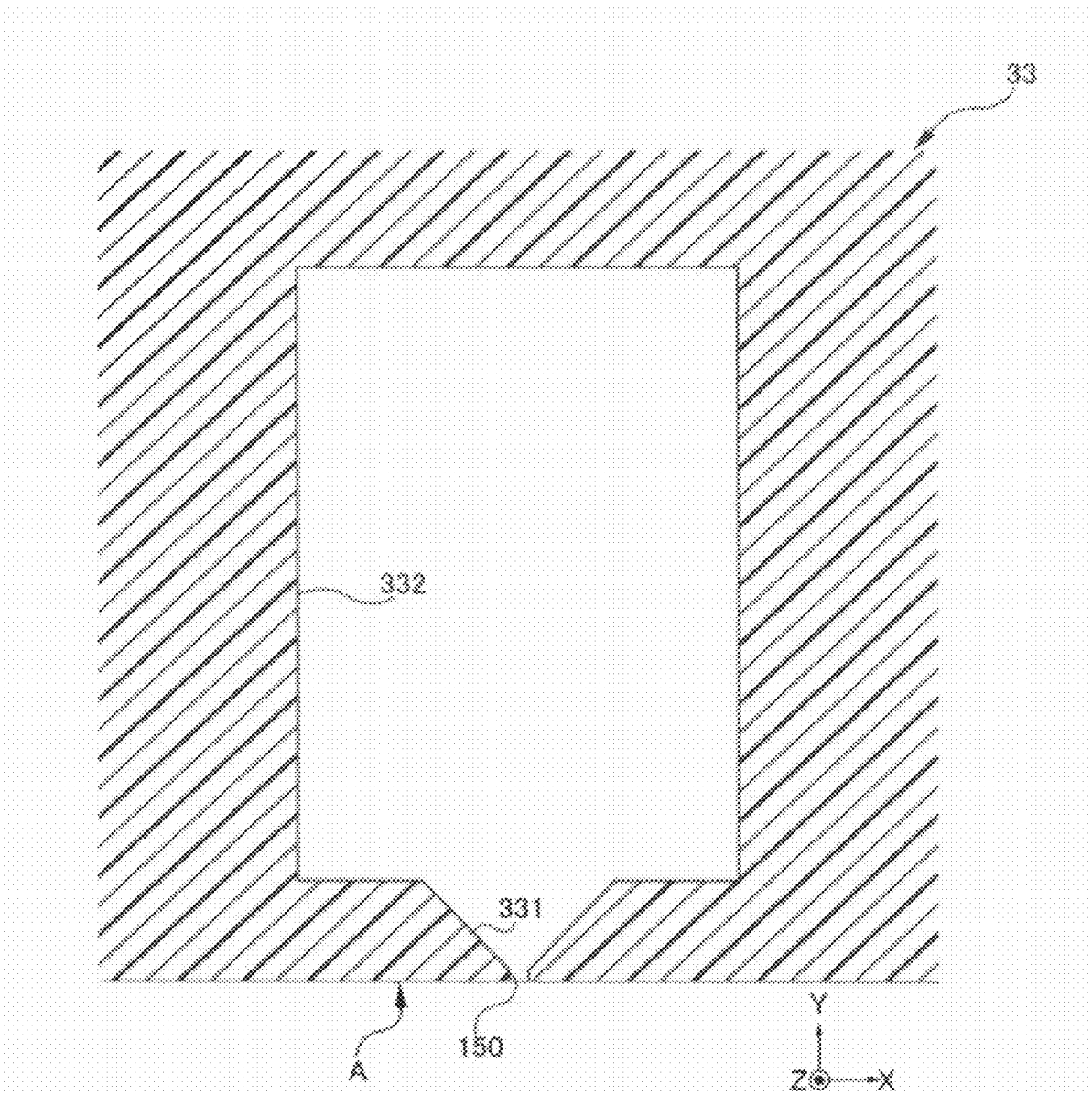
FIGS. 23(a) and 23(b) are sectional views showing a production process of a magnetic head as seen from a lamination plane.

On the other hand, as seen from the lamination plane (X-Y plane), the resist pattern 33 has a shape shown in FIG. 23(a). In order to match the above-described shape of the main magnetic pole layer 13, accordingly, the resist pattern 33 has an inner wall surface 332 forming a rectangular space which has a constant width in the track width direction and an inner wall surface 331 extending in front of the inner wall surface 332 and forming a generally triangular space whose width decreases toward the magnetic medium-facing surface.

Figure 21C:
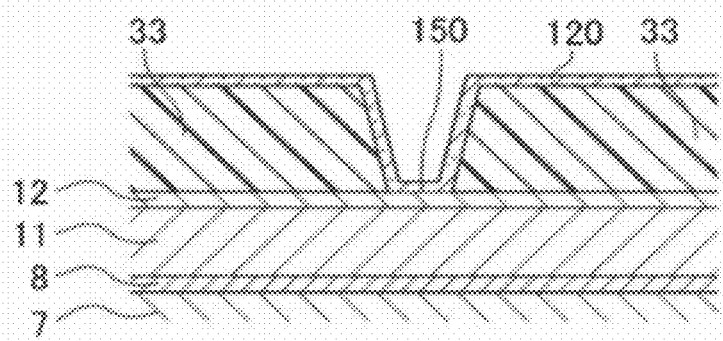

After formation of the resist pattern 33, as shown in FIG. 21(c), a non-magnetic film 120 having a uniform film thickness is formed by deposition, using an ALD process or a CVD process, in such a manner as to cover at least the inner wall surface of the resist pattern 33 within the recess 150. At this time, the film thickness of the non-magnetic film 120 is adjusted so as to obtain the above-described pole width W1.

Figure 21D:
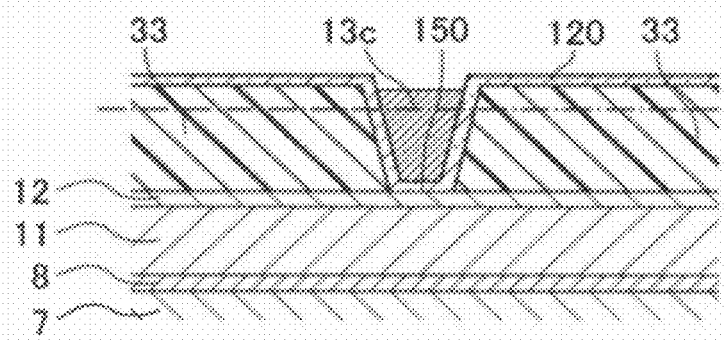

Then, as shown in FIG. 21(d), the tip portion 13c of the main magnetic pole layer 13 is formed within the recess 150 by using an electroplating process or the like. In this case, for example, after formation of a seed layer (not shown), the seed layer is used as an electrode film to grow a plated film. However, it is also possible to use a sputtering process instead of an electroplating process.

Then, using a milling process or a CMP process, the surface is polished down to a position indicated by a dotted line in the figure. With this, as shown in FIG. 21(e), the resist pattern 33 is exposed at both sides of the tip portion 13c.

Subsequently, as shown in FIG. 21(f), the resist pattern 33 is removed, for example, by a cleaning process with an organic solvent or an ashing process to expose both side faces of the tip portion 13c, and then the insulating layers 11, 12 are selectively removed at an area overlapping with the tip portion 13c in the thickness direction (Z direction) and at both side areas thereof. Concretely, the insulating layers 8, 11, 12 are all removed from an area of the width W3 with the tip portion 13c centered in the recording track width direction (X direction). Here, if the insulating layers 8, 11, 12 are made of alumina, for example, they can be dissolved and removed by using a given solvent (for example, an alkaline solution). This results in exposing not only the surface of the magnetic layer 7 but also the peripheral surface of the tip portion 13c.

After removal of the insulating layers 8, 11, 12 from an area in the vicinity of the tip portion 13c, an insulating material such as alumina is deposited to surround the tip portion 13c by using a CVD process or an ALD process, as shown in FIG. 21(g). This provides the side gaps 121 and an insulating film 122 including the insulating layer 12 as a leading gap. At this time, the insulating material is also deposited on the surface of the magnetic layer 7 to reform the insulating layer 8.

Figure 21H:
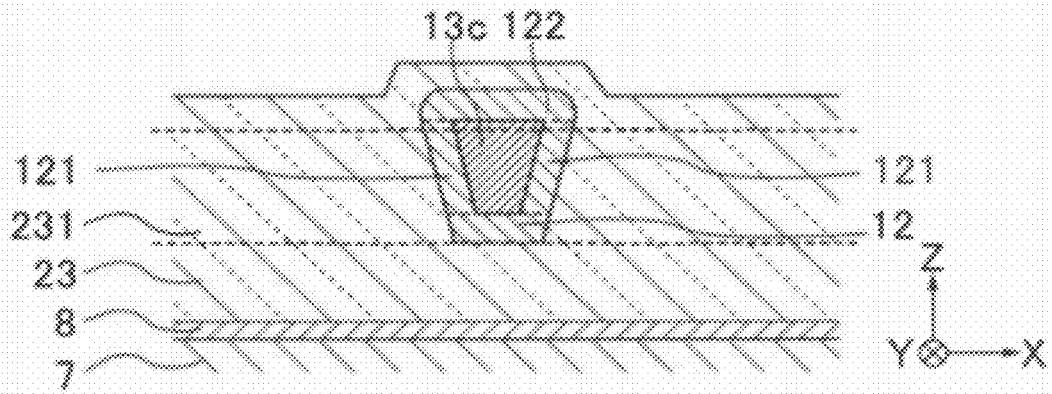

Subsequently, as shown in FIG. 21(h), a magnetic layer 231 is formed by using an electroplating process or the like to cover the whole and completely bury the tip portion 13c and the insulating film 122. Of the magnetic layer 231, a portion located on the leading side as seen from the insulating layer 12 (a portion located adjacent to the insulating layer 8) becomes the leading shield 23.

Figure 21I:
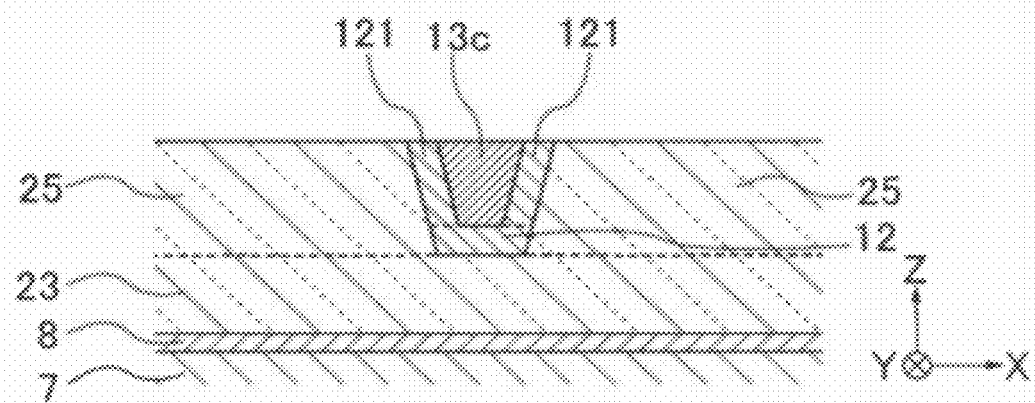
Figure 21J:
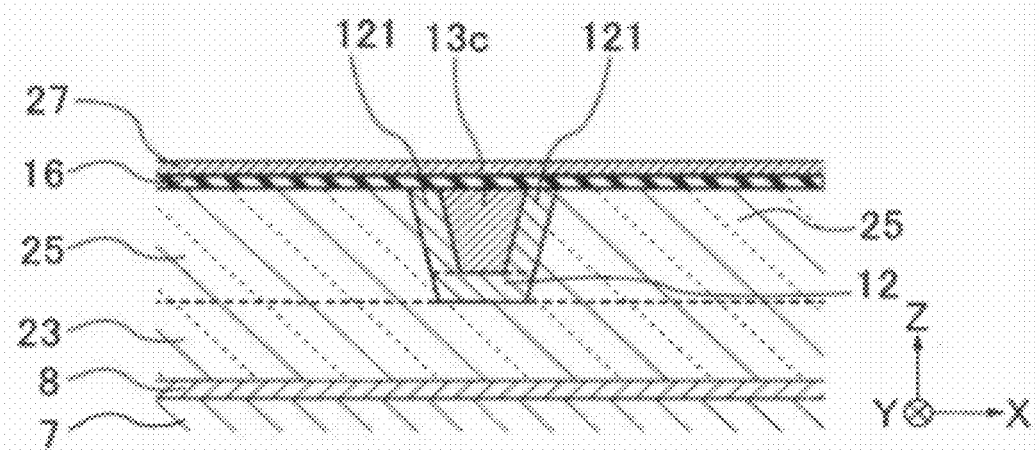
Figure 21K:
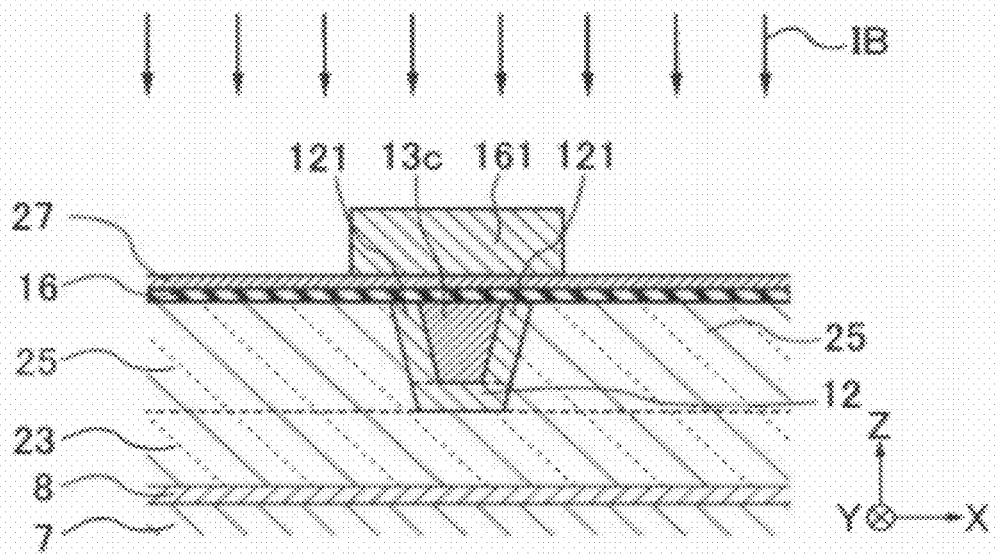
Figure 21L:
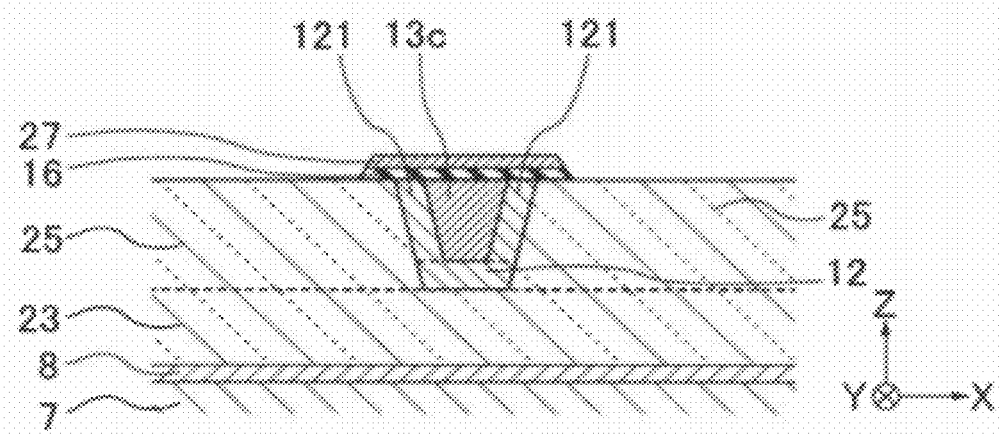
Figure 21M:
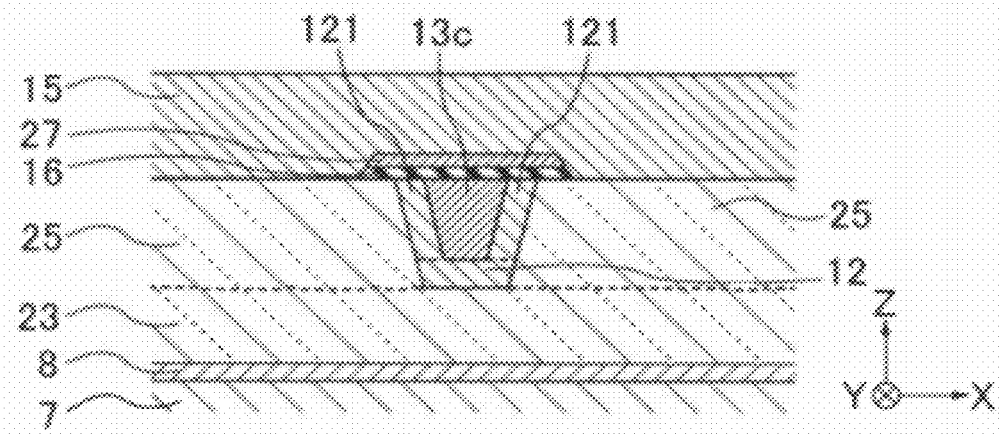

In addition, using a milling process or a CMP process, the surface is polished down to a position indicated by a dotted line in the figure. With this, the tip portion 13c is exposed and the side shields 25 are formed, as shown in FIG. 21(i). At this time, excessive polishing may be performed on demand in order to ensure the exposure of the tip portion 13c.

Figure 22B:
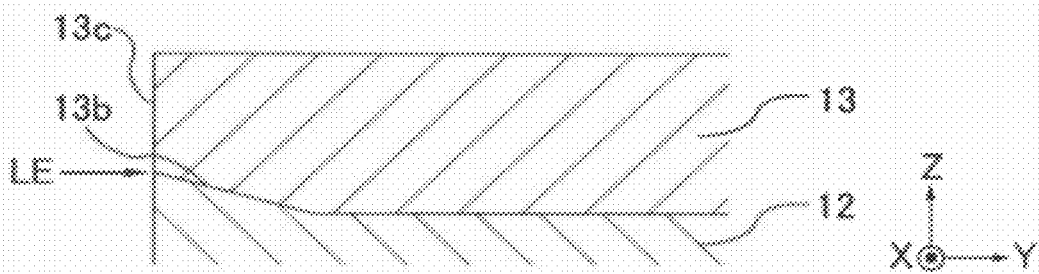

The main magnetic pole layer 13 thus formed is laid on the insulating layer 12 with the pole tip 13c exposed on the magnetic medium-facing surface A, as shown in FIG. 22(b) as an enlarged sectional view taken along the Y-Z plane. Here, the above-described second tapered face 13b is formed to extend from the leading edge LE of the pole tip 13c along the tapered face 12a of the insulating film 120 shown in FIG. 22(a).

Figures 22C, 22D:
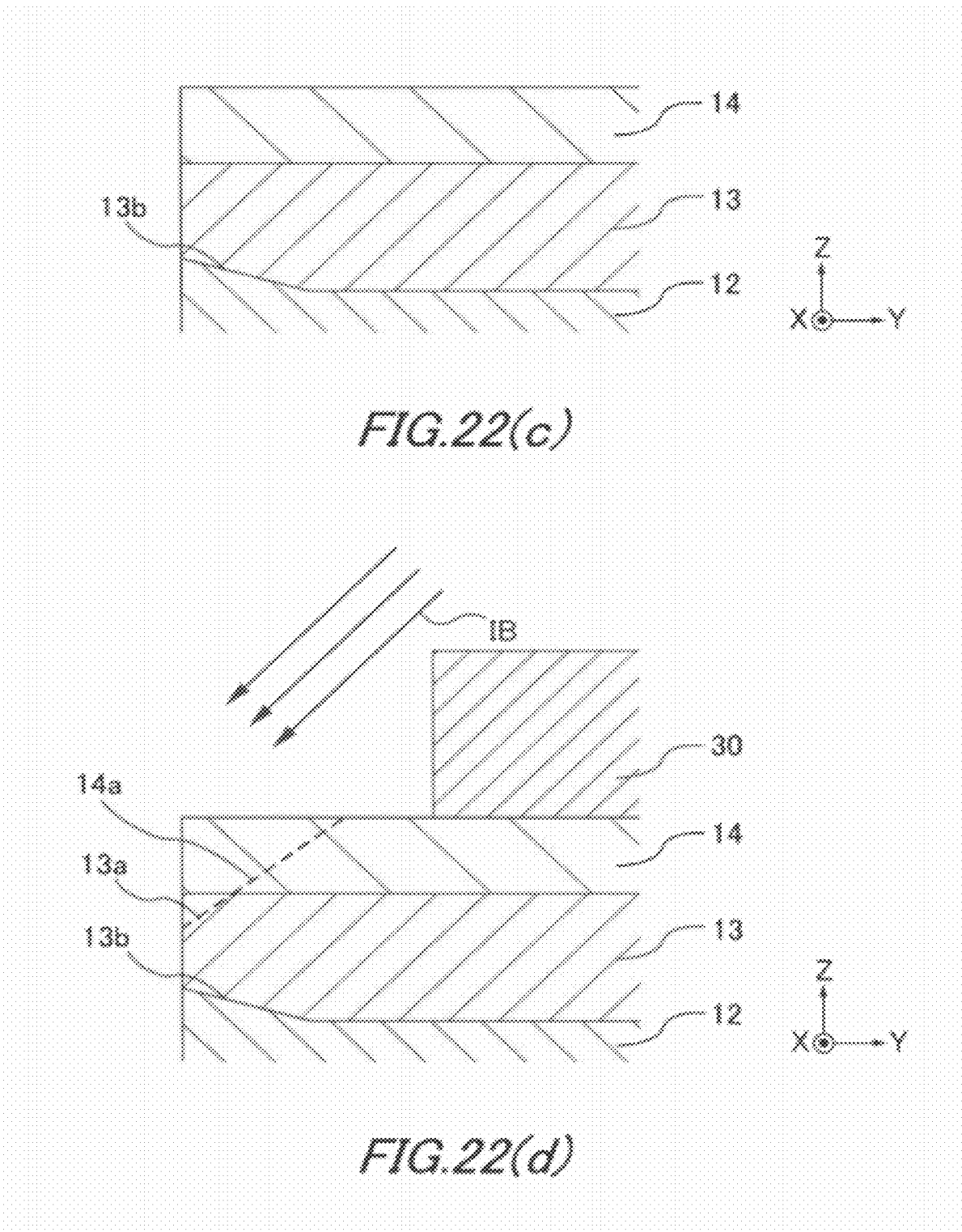
Figure 22E:
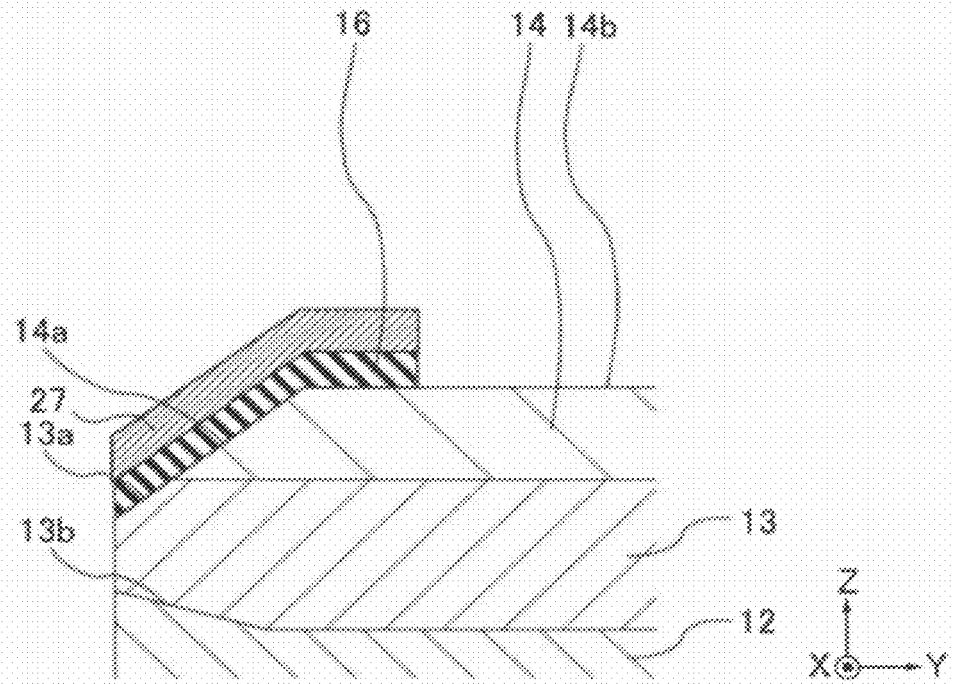
Figure 22F:
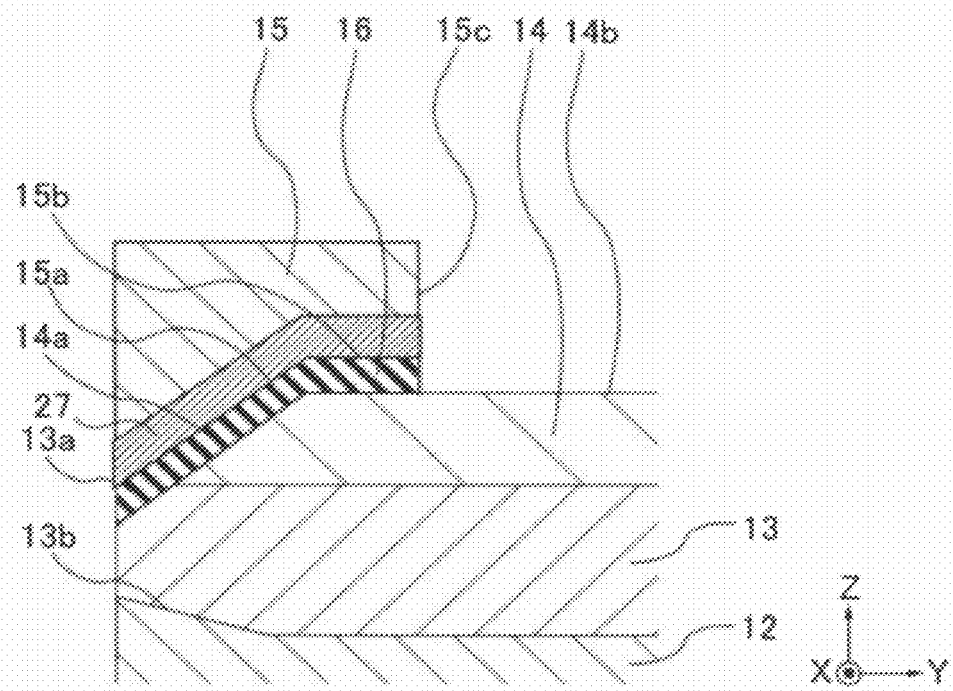

Next will be described a formation process of the tapered face 13a, 14a with reference to FIGS. 22(c) and 22(d), which are similar enlarged sectional views.

After formation of the main magnetic pole layer 13, the non-magnetic layer 14 is formed by a known technique such as sputtering to be laid on the main magnetic pole layer 13, as shown in FIG. 22(*c*).

Moreover, as shown in FIG. 22(*d*), a resist pattern 30 as a mask for forming the tapered face 13*a*, 14*a* is formed on the non-magnetic layer 14 by a photolithography process. A thickness of the resist pattern 30 or the like is properly set depending on the intended tapered face 13*a*, 14*a*.

Then, the main magnetic pole layer 13 and the non-magnetic layer 14 are etched by ion milling down to a position indicated by a dotted line. Ion milling is performed by irradiating ion beam IB at a certain angle while fixing the substrate. After completion of the etching process, the resist pattern 30 is removed.

Thus, the tapered face 13*a*, 14*a* is formed to extend from the trailing edge TE of the pole tip 13*c*, continue from the main magnetic pole layer 13 to the non-magnetic layer 14, and have a constant inclination angle. It should be noted that although ruthenium may be taken as a typical example of the non-magnetic layer 14, as described above, other materials may also be employed as long as having a milling rate close to that of the main magnetic pole layer 13.

Subsequently, as shown in FIGS. 21(*j*) and 22(*e*), the trailing gap layer 16 and the second magnetic layer 27 are formed by a known technique such as sputtering to be laid over the main magnetic pole layer 13 and the non-magnetic layer 14, covering the tapered face 13*a*, 14*a* and a front portion of a flat face 14*b* of the non-magnetic layer 14.

Then, as shown in FIG. 21(*k*), a resist pattern 161 is formed by a photolithography process in the vicinity of the upper side of the tip portion 13*c* of the main magnetic pole layer 13. Then, the trailing gap layer 16 and the second magnetic layer 27 are etched and removed by ion milling except the portion in the vicinity of the upper side of the tip portion 13*c*. Ion milling is performed by irradiating ion beam IB from above. After completion of the etching process, the resist pattern 161 is removed.

Thus, as shown in FIG. 21(*l*), there is obtained a layer structure where the trailing gap layer 16 and the second magnetic layer 27 are present only in the vicinity of the upper side of the tip portion 13*c* as seen from the magnetic medium-facing surface A.

Thereafter, as shown in FIGS. 21(*m*) and 22(*f*), the trailing shield layer 15, which is to be exposed on the magnetic medium-facing surface A, is formed by using a plating process or the like to be laid over the main magnetic pole layer 13 and the non-magnetic layer 14 with the trailing gap layer 16 and the second magnetic layer 27 in between.

Then, the yoke layer 22 is formed behind the non-magnetic layer 14, and the space between it and the trailing shield layer 15 is filled with the insulating layer 17, and the surface is polished by a CMP process.

Figure 23B:
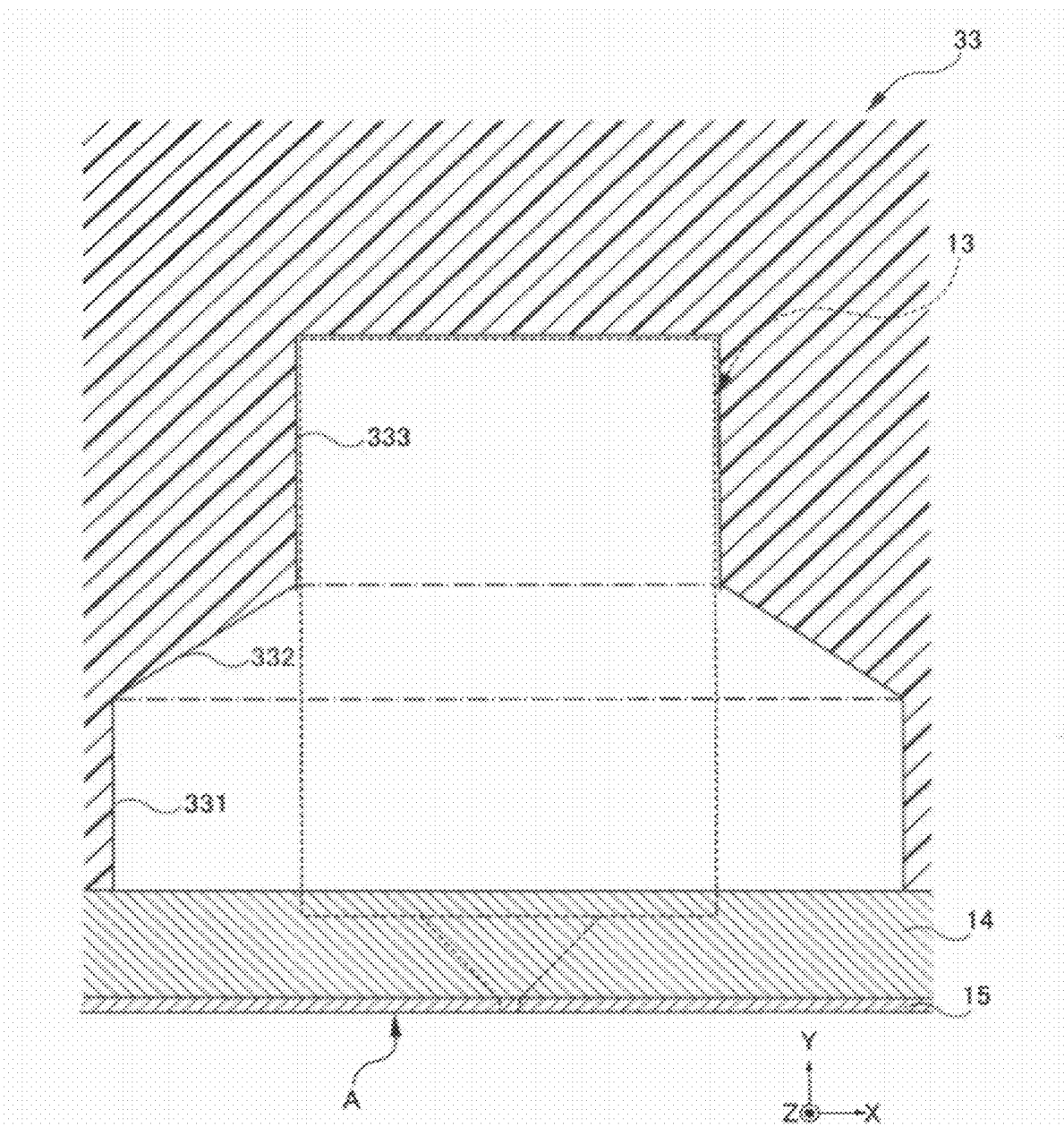

FIG. 23(*b*) shows the shape of a resist pattern 34 for forming the yoke layer 22 as seen from the lamination plane (X-Y plane). In order to match the shape of the yoke layer 22 shown in FIG. 6, the resist pattern 34 has an inner wall surface 333 forming a rectangular space which has a constant width in the track width direction, an inner wall surface 332 extending in front of the inner wall surface 333 and forming a trapezoidal space whose width increases toward the magnetic medium-facing surface, and an inner wall surface 331 forming a rectangular space which has a constant width in the track width direction. However, it goes without saying that the resist pattern 34 is not limited to such a shape but may be formed in accordance with the design, for example, to match the shape of the yoke layer 22 shown in FIG. 12.

Through the process thus far described, there is obtained the structure around the main magnetic pole layer 13 and the yoke layer 22 of the magnetic head shown in FIG. 2.

3. Head Assembly

Next will be described a head assembly according to the present invention. The head assembly according to the present invention includes the above-described magnetic head and a head support device. The head support device supports the magnetic head in such a manner as to permit rolling and pitching of the magnetic head. In the present invention, examples of the head assembly include an HGA (head gimbal assembly) in which the magnetic head is mounted on a head support device (gimbal) and an HAA (head arm assembly) in which the HGA is mounted on an arm.

Figure 24:
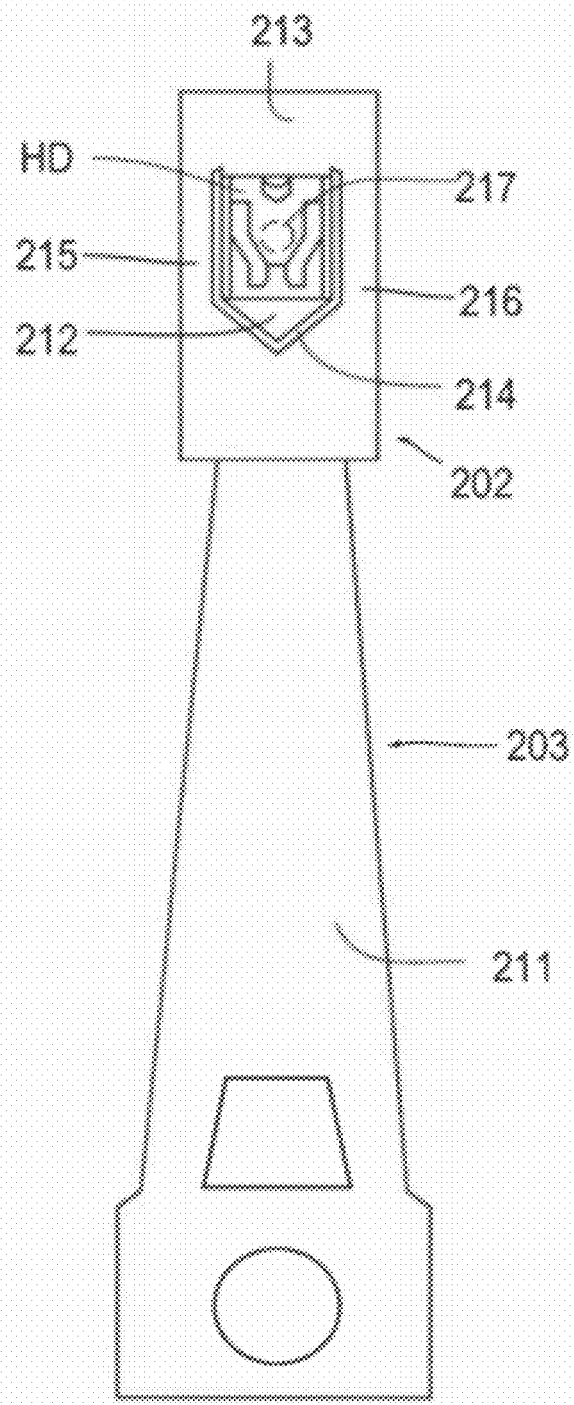
FIG. 24 is a top view of an HGA.
Figure 25:
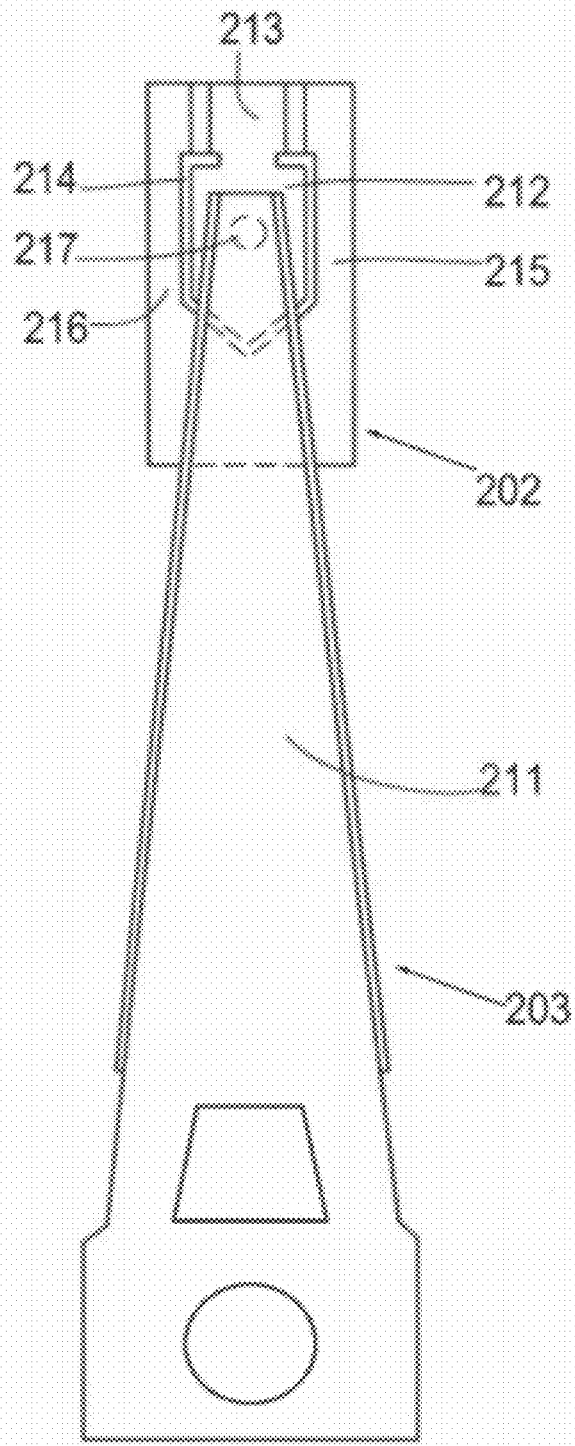
FIG. 25 is a bottom view of a HGA.

FIG. 24 is a top view of a head assembly according to the present invention, and FIG. 25 is a bottom view of the head assembly shown in FIG. 24. The head assembly is an HGA including a suspension 203 and the magnetic head HD. The suspension 203 includes a load beam 211 and a flexure 202. The load beam 211 has a load dimple 217 in proximity to a free end on a centrally-extending longitudinal axis.

The flexure 202 is formed from a thin leaf spring and subjected to a pressing load from the load dimple 217 with one side thereof attached to one side of the load beam 211 where the load dimple 217 is located. The magnetic head HD is attached to the other side of the flexure 202. The flexure 202 is bonded to the load beam 211 at the side where the load dimple 217 is located.

The flexure 202 has a tongue portion 212 in the center thereof. At one end, the tongue portion 212 is bonded to a lateral frame portion 213 of the flexure 202. Both ends of the lateral frame portion 213 of the flexure 202 are connected to outer frame portions 215, 216. A groove 214 is formed between the tongue portion 212 and the outer frame portions 215, 216, extending around the tongue portion 212. The magnetic head HD is attached to one side of the tongue portion 212 by means of an adhesive or the like, which is kept in spring contact with the tip of the load dimple 217.

One face of the magnetic head HD opposite from the air bearing surface of the slider is attached to the tongue portion 212 of the suspension 203. Flexible leads and so on not shown in the drawings are connected to the magnetic head HD.

Figure 26:
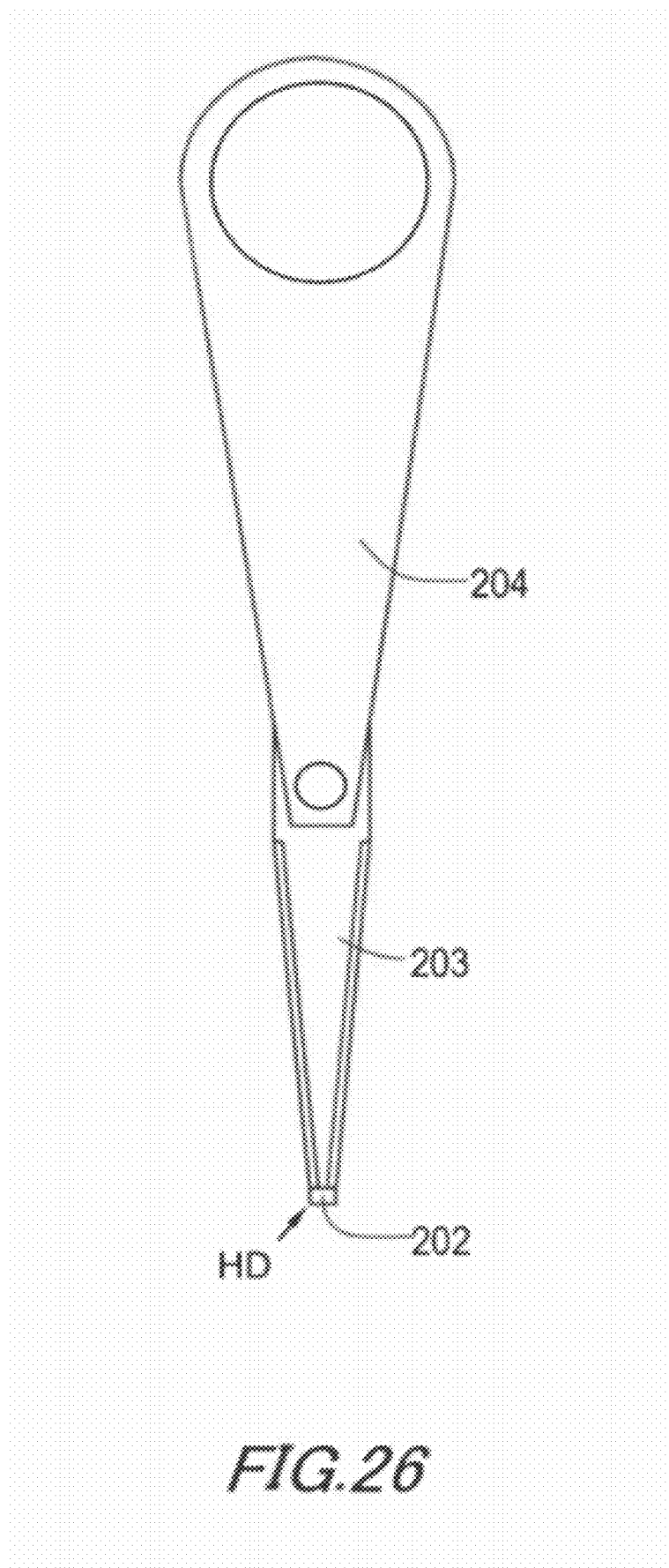
FIG. 26 is a plan view of an HAA.

FIG. 26 is a front view of an HAA. The HAA includes the suspension 203, the magnetic head HD and an arm 204. The arm 204 is integrally formed from a suitable non-magnetic metallic material such as aluminum alloy. The arm 204 is provided with a mounting hole. The mounting hole is used for mounting on a positioning device provided in a magnetic disk apparatus. One end of the suspension 203 is secured to the arm 204, for example, with a ball connecting structure.

Since the head assembly includes the magnetic head according to the present invention, it also has the same effects.

4. Magnetic Recording/Reproducing Apparatus

Figure 27:
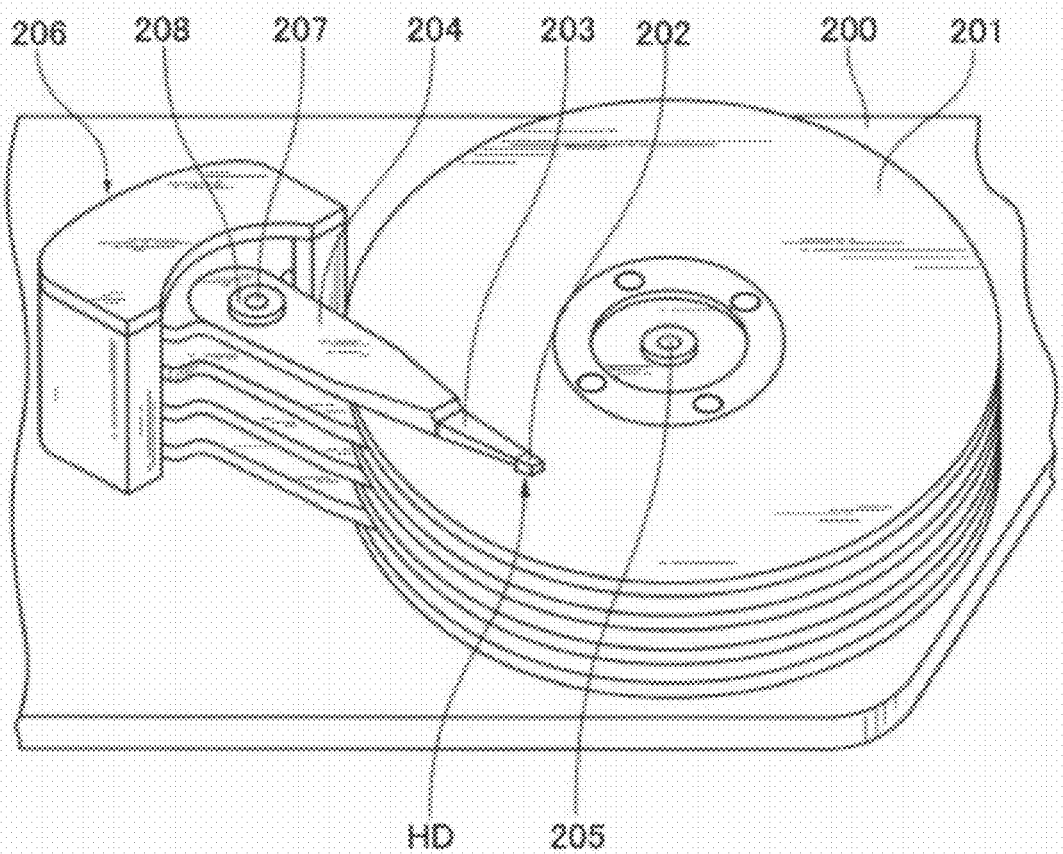
FIG. 27 is a perspective view of an internal structure of a magnetic recording/reproducing apparatus.

Finally, a magnetic recording/reproducing apparatus according to the present invention will be described. FIG. 27 is a perspective view of the magnetic recording/reproducing apparatus. In FIG. 27, a case 200 is partially cut out, making it easy to see the internal structure of the apparatus.

This magnetic recording/reproducing apparatus is equipped with the above head assembly, and in the present embodiment, a hard disk drive is taken as an example for explanation. The magnetic recording/reproducing apparatus includes, within the case 200, a plurality of magnetic disks (i.e., hard disks) 201 corresponding to the magnetic recording medium M, on which information is to be magnetically recorded, a plurality of suspensions 203 disposed corresponding to the respective magnetic disks 201 and supporting the magnetic heads HD at their one ends, and a plurality of arms 204 supporting the other ends of the suspensions 203.

When the magnetic disk 201 rotates for recording or reproducing information, the magnetic head HD takes off from the recording surface of the magnetic disk 201 utilizing an airflow generated between the recording surface (magnetic head-facing surface) of the magnetic disk 201 and the air bearing surface A.

The magnetic disks 201 are rotatable about a spindle motor 205 which is fixed to the case 200. The arms 204 are connected to an actuator 206 being a power source and are pivotable through a bearing 208 about a fixed shaft 207 which is fixed to the case 200. The actuator 206 is constructed to include, for example, a driving source such as a voice coil motor.

Using the head assembly equipped with the magnetic head, as has been described above, the magnetic recording/reproducing apparatus records information on the magnetic disk 201 by applying a recording magnetic field and reproducing information from the magnetic disk. Thus, the magnetic recording/reproducing apparatus has the same effects as the magnetic head according to the present invention.

The present invention has been described in detail above with reference to preferred embodiments. However, obviously those skilled in the art could easily devise various modifications of the invention based on the technical concepts underlying the invention and teachings disclosed herein.

What is claimed is:

1. A magnetic head comprising a main magnetic pole layer and a yoke layer,
   the main magnetic pole layer being capable of generating a magnetic flux of a recording magnetic field and including a magnetic pole front part and a magnetic pole rear part,
   the yoke layer being disposed at the magnetic pole rear part and including a yoke front part and a yoke rear part,
   the magnetic pole front part extending on a magnetic medium-facing surface side of the magnetic pole rear part with a width in a track width direction being smaller than that of the magnetic pole rear part, and
   the yoke front part extending on the magnetic medium-facing surface side of the yoke rear part with a width in the track width direction being larger than that of the magnetic pole rear part and that of the yoke rear part.

2. The magnetic head of claim 1, wherein the width of the magnetic pole rear part and/or the yoke rear part in the track width direction is constant.

3. The magnetic head of claim 2, wherein a ratio of an overall length of the yoke layer in a height direction to a length of the yoke rear part in the height direction is from 8:2 to 8:7.

4. The magnetic head of claim 2, wherein a width ratio of the yoke rear part to the yoke front part in the track width direction at an end on the magnetic medium-facing surface side is from 6:11 to 6:13.

5. The magnetic head of claim 1, wherein the width of the yoke front part in the track width direction is constant.

6. The magnetic head of claim 1, wherein the width of the yoke front part in the track width direction increases toward the magnetic medium-facing surface.

7. The magnetic head of claim 1, wherein the yoke front part includes a first area and a second area,
   the first area extending on the magnetic medium-facing surface side of the second area with a constant width in a track width direction,
   the second area widening with a width in the track width direction increasing toward the magnetic medium-facing surface from the same width as the yoke rear part to the same width as the first area.

8. The magnetic head of claim 1, wherein the yoke front part and the magnetic pole rear part have aligned ends on the magnetic medium-facing surface side.

9. The magnetic head of claim 1, wherein the yoke rear part and the magnetic pole rear part have aligned ends on a side remote from the magnetic medium-facing surface.

10. A head assembly comprising a magnetic head and a head support device, wherein
    the magnetic head is claimed in claim 1, and
    the head support device supports the magnetic head in such a manner as to permit rolling and pitching of the magnetic head.

11. A magnetic recording/reproducing apparatus comprising a head assembly and a magnetic recording medium, wherein
    the head assembly is claimed in claim 10 and capable of recording information on the magnetic recording medium by applying the recording magnetic field and reproducing information from the magnetic recording medium.

* * * * *